US008627257B2

(12) United States Patent  
Kim et al.

(10) Patent No.: US 8,627,257 B2  
(45) Date of Patent: Jan. 7, 2014

(54) METHOD OF DESIGNING NONVOLATILE MEMORY DEVICE

(75) Inventors: Jae-Ho Kim, Seoul (KR); Dae-Sin Kim, Hwaseong-si (KR); Hyun-Jae Kim, Hwaseong-si (KR); Young-Gu Kim, Gwangmyeong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/570,498

(22) Filed: Aug. 9, 2012

(65) Prior Publication Data

US 2013/0047132 A1 Feb. 21, 2013

(30) Foreign Application Priority Data

Aug. 16, 2011 (KR) ........................ 10-2011-0081028

(51) Int. Cl.  
*G06F 17/50* (2006.01)

(52) U.S. Cl.  
USPC .......................................................... 716/132

(58) Field of Classification Search  
USPC .......................................................... 716/132  
See application file for complete search history.

(56) References Cited

U.S. PATENT DOCUMENTS

2007/0234144 A1* 10/2007 Gongwer et al. .............. 714/718  
2010/0118608 A1    5/2010 Song et al.  
2012/0008399 A1*  1/2012 Hoei et al. ................ 365/185.17

FOREIGN PATENT DOCUMENTS

JP      2001-023384       1/2001  
JP      2008-152866       7/2008  
KR   1020100052159 A      5/2010

* cited by examiner

*Primary Examiner* — Thuan Do  
*Assistant Examiner* — Mohammed Alam  
(74) *Attorney, Agent, or Firm* — Volentine & Whitt, PLLC

(57) ABSTRACT

In a computer-implemented method of designing a nonvolatile memory device, first parameters associated with external environmental conditions are set. Second parameters associated with structural characteristics and internal environmental conditions are set. A first initial operation condition associated with an erase operation is determined based on the first and second parameters. A second initial operation condition associated with a program operation is determined based on the first and second parameters and the first initial operation condition. A final operation condition associated with reliability is determined based on the first and second parameters, and the first and second initial operation condition.

20 Claims, 17 Drawing Sheets

METHOD OF DESIGNING NONVOLATILE MEMORY DEVICE

CROSS-REFERENCE TO RELATED APPLICATION

A claim of priority under 35 USC §119 is made to Korean Patent Application No. 2011-0081028, filed on Aug. 16, 2011, in the Korean Intellectual Property Office (KIPO), the contents of which are herein incorporated by reference in their entirety.

BACKGROUND

Example embodiments relate to semiconductor memory devices, and more particularly, example embodiments relate to the design of nonvolatile memory devices.

Semiconductor memory devices can be roughly divided into two categories according to whether they retain stored data when disconnected from power. These categories include volatile memory devices, which lose stored data when disconnected from power, and nonvolatile memory devices, which retain stored data when disconnected from power.

Nonvolatile memory device operate in different modes to perform different operations. For instance, a nonvolatile memory device can operate in a program mode to perform a program operation, a read mode to perform a read operation, and an erase mode to perform an erase operation.

Numerous factors must be considered when designing a nonvolatile memory device. As examples, operational conditions, environmental conditions, manufacturing conditions and structural characteristics of the nonvolatile memory device must all be taken into account during the complex and time consuming design process.

SUMMARY

In a computer-implemented method of designing a nonvolatile memory device according to some example embodiments, first parameters associated with external environmental conditions of the nonvolatile memory device are set. Second parameters associated with structural characteristics and internal environmental conditions of the nonvolatile memory device are set. A first initial operation condition is determined based on the first parameters and the second parameters. The first initial operation condition is associated with an erase operation of the nonvolatile memory device. A second initial operation condition is determined based on the first parameters, the second parameters and the first initial operation condition. The second initial operation condition is associated with a program operation of the nonvolatile memory device. A final operation condition is determined based on the first parameters, the second parameters, the first initial operation condition and the second initial operation condition. The final operation condition is associated with reliability of the nonvolatile memory device.

The first initial operation condition may be determined by setting an erasing scheme and an erase verification voltage based on the first parameters and the second parameters, by computer simulating the erase operation on memory cells included in the nonvolatile memory device based on the erasing scheme, by computer simulating a first sensing operation on the memory cells based on the erase verification voltage to generate a first sensing result, and by determining a first threshold voltage distribution of the memory cells based on the first sensing result. The first threshold voltage distribution may correspond to the first initial operation condition.

The erase operation and the first sensing operation may be repeatedly simulated when it is judged based on the first sensing result that at least one of the memory cells is incompletely erased. The first threshold voltage distribution may be determined to correspond to the result of the erase operation when it is judged based on the first sensing result that all of the memory cells are completely erased.

The first initial operation condition may be determined by further measuring an erasing time that is required to complete the erase operation and the first sensing operation.

The second initial operation condition may be determined by setting a programming scheme and a program verification voltage based on the first parameters, the second parameters and the first initial operation condition, by computer simulating the program operation on the memory cells based on the programming scheme, by computer simulating a second sensing operation on the memory cells based on the program verification voltage to generate a second sensing result, and by determining a second threshold voltage distribution of the memory cells based on the second sensing result. The second threshold voltage distribution may correspond to the second initial operation condition.

The program operation and the second sensing operation may be repeatedly simulated when it is judged based on the second sensing result that at least one of the memory cells is incompletely programmed. The second threshold voltage distribution may be determined to correspond to the result of the program operation when it is judged based on the second sensing result that all of the memory cells are completely programmed.

The second initial operation condition may be determined by further measuring a programming time that is required to complete the program operation and the second sensing operation.

The final operation condition may be determined by setting a reliability testing scheme based on the first parameters, the second parameters, the first initial operation condition and the second initial operation condition, by computer simulating a reliability test operation on the memory cells based on the reliability testing scheme to generate a test result, and by determining a third threshold voltage distribution of the memory cells based on the test result. The third threshold voltage distribution may correspond to the final operation condition.

The reliability test operation may be computer simulated by computer simulating a stress-applying operation on the memory cells based on the reliability testing scheme, by analyzing a threshold voltage distribution of the memory cells after the stress-applying operation to generate an analysis result, and by selectively adjusting a level of the program verification voltage based on the analysis result.

The level of the program verification voltage may be changed when it is judged based on the analysis result that the threshold voltage distribution of the memory cells after the stress-applying operation is different from the second threshold voltage distribution. The level of the program verification voltage may be maintained when it is judged based on the analysis result that the threshold voltage distribution of the memory cells after the stress-applying operation is substantially the same as the second threshold voltage distribution.

An optimization verifying operation may be further performed to check whether the final operation condition is optimized and to generate a verifying result.

At least one of design schemes for the nonvolatile memory device may be modified and the final operation condition may be redetermined when it is judged based on the verifying result that the final operation condition is not optimized. The computer-implemented method of designing the nonvolatile memory device may be terminated when it is judged based on the verifying result that the final operation condition is optimized.

The optimization verifying operation may be performed by checking whether the final operation condition complies with a design target of the nonvolatile memory device to generate a check result, and by selectively modifying at least one of the first and second parameters and determination criterions for the first and second initial operation conditions based on a first reference value, a second reference value, a third reference value and the check result. The final operation condition may be redetermined based on at least one of the modified parameters and the modified determination criterions.

A first count value, a second count value and a third count value that are changed as the redetermination number of the final operation condition increases may be generated. The at least one of the parameters and the determination criterions may be selectively modified by modifying the determination criterion for the second initial operation condition when the first count value is smaller than the first reference value, by modifying the determination criterion for the first initial operation condition when the second count value is smaller than the second reference value, by changing the second parameters when the third count value is smaller than the third reference value, and by changing the first parameters when the first count value is larger than the first reference value, the second count value is larger than the second reference value, and the third count value is larger than the third reference value.

In a computer-implemented method of designing a nonvolatile memory device according to other example embodiments, first parameters associated with external environmental conditions of the nonvolatile memory device are set. Second parameters associated with structural characteristics and internal environmental conditions of the nonvolatile memory device are set. An erase threshold voltage distribution is determined based on an erasing scheme by setting a target erasing speed with respect to memory cells included in the nonvolatile memory device based on the first parameters and the second parameters, and by setting the erasing scheme to be satisfied the target erasing speed. An initial program threshold voltage distribution is determined based on a programming scheme by setting a target programming speed, an interference condition and a disturbance condition with respect to the memory cells based on the first parameters, the second parameters and the erase threshold voltage distribution, and by setting the programming scheme to be satisfied the target programming speed, the interference condition and the disturbance condition. A final program threshold voltage distribution is determined based on a reliability testing scheme by setting an endurance condition and a data retention condition with respect to the memory cells based on the first parameters, the second parameters, the erase threshold voltage distribution and the initial program threshold voltage distribution, and by setting the reliability testing scheme to be satisfied the endurance condition and the data retention condition. An optimization verifying operation is performed to check whether the final program threshold voltage distribution is optimized.

In a computer-implemented method of designing a nonvolatile memory device according to other example embodiments, an erasing scheme and an erase verification voltage are set in accordance with at least one set parameter. A computer simulated erase operation of memory cells of the nonvolatile memory device is executed in accordance with the erasing scheme, and a computer simulated first sensing operation of the memory cells is executed based on the erase verification voltage. The computer simulated erase operation and the computer simulated first sensing operation are repeated until successful completion of the erase operation has been verified, and a first threshold voltage distribution of the memory cells is determined upon successful completion of the erase operation. A programming scheme and a program verification voltage are set in accordance with the first threshold voltage distribution and the at least one set parameter. A computer simulated program operation of the memory cells of the nonvolatile memory device is executed in accordance with the programming scheme, and a computer simulated second sensing operation of the memory cells based on the program verification voltage. The computer simulated program operation and the computer simulated second sensing operation are repeated until successful completion of the program operation has been verified, and a second threshold voltage distribution of the memory cells is determined upon successful completion of the program operation.

The at least one set parameter may include first parameters associated with external environmental conditions of the nonvolatile memory device, and second parameters associated with structural characteristics and internal environmental conditions of the nonvolatile memory device.

The method may further include determining a final operation design condition of the nonvolatile memory device based on the first parameters, the second parameters, the first threshold voltage distribution and the second threshold voltage distribution, where the final operation condition is associated with a reliability of the nonvolatile memory device.

The method may further include measuring an erasing time that is required to complete the erase operation and the first sensing operation, and determining a programming time that is required to complete the program operation and the second sensing operation.

The set parameters may be supplied from one of a manufacturing process using test element group (TEG) and a technology computer aided design (TCAD) program.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
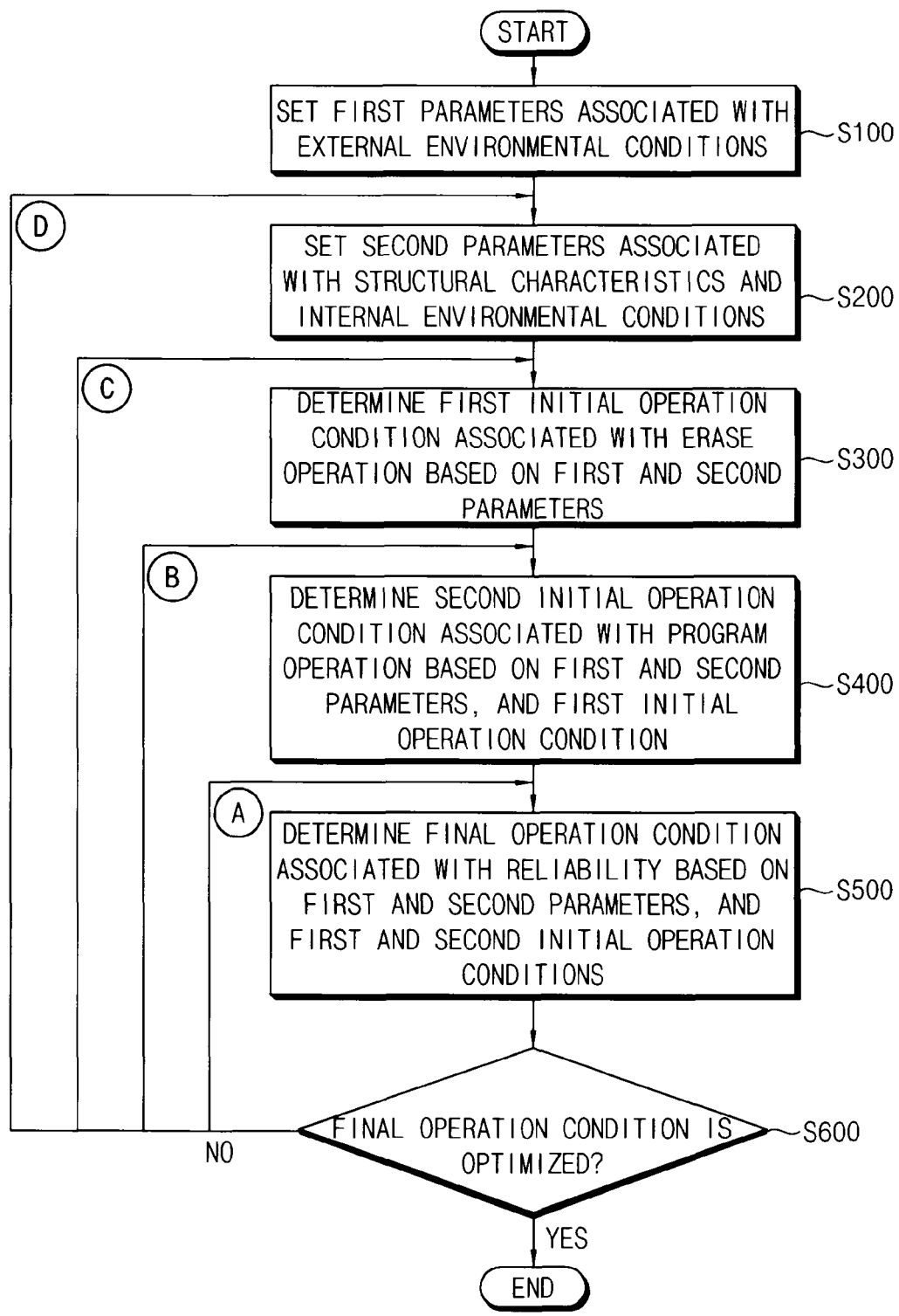
FIG. 1 is a flowchart illustrating a computer-implemented method of designing a nonvolatile memory device according to some example embodiments.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart illustrating a computer-implemented method of designing a nonvolatile memory device according to some example embodiments.

The method of FIG. 1 may be applied in a nonvolatile memory device performing a write operation in which a threshold voltage of a memory cell in the nonvolatile memory device is programmed by applying a predetermined voltage to the memory cell. Hereinafter, the computer-implemented method of designing the nonvolatile memory device according to example embodiments will be described based on a flash memory device, and detailed example configurations of a flash memory device and a memory cell array included in the flash memory device will be described below with reference to FIGS. 2 and 3. However, the computer-implemented method of designing the nonvolatile memory device according to example embodiments may be applied in other types of nonvolatile memory devices, such as a phase change random access memory (PRAM), a resistance random access memory (RRAM), a magnetic random access memory (MRAM), a ferroelectric random access memory (FRAM), and so on.

The method of FIG. 1 may be performed to design a nonvolatile memory device that complies with a predetermined design target. The design target may include operational conditions such as a tolerance with respect to designing an error correction code (ECC) for the nonvolatile memory device, a target erasing speed, a target programming speed, and reliability test conditions, and so on.

Referring to FIG. 1, in the computer-implemented method of designing the nonvolatile memory device, first parameters are set (step S100). The first parameters are associated with external environmental conditions of the nonvolatile memory device. The external environmental conditions may reflect the physical location in which the nonvolatile memory device is mounted and/or used. For example, the first parameters may include an operating temperature, an operating humidity, an operating pressure, and so on.

Second parameters are set (step S200). The second parameters are associated with structural characteristics and internal environmental conditions of the nonvolatile memory device. For example, the second parameters may include structural parameters such as a size, a channel width, a channel length, and a critical dimension of an internal element (e.g., a transistor) included in the nonvolatile memory device. The second parameters may further include a size of a semiconductor chip including the nonvolatile memory device. The internal environmental conditions may reflect physical stresses in the nonvolatile memory device (e.g., on an internal element). For example, the second parameters may include an operating voltage, and heat and stress of an internal element caused by an operation of the nonvolatile memory device. The internal environmental conditions may further indicate manufacturing conditions, and the second parameters may further include a manufacturing temperature and a manufacturing pressure.

According to example embodiments, the first and second parameters may be provided from a manufacturing process by using test element group (TEG), or may be provided from a technology computer aided design (TCAD) program by a designer. Although FIG. 1 illustrates that the second parameters are set after the first parameters are set, according to example embodiments, the second parameters may be set before the first parameters are set, or the first and second parameters may be concurrently set.

A first initial operation condition is determined based on the first parameters and the second parameters (step S300), and a second initial operation condition is determined based on the first parameters, the second parameters and the first initial operation condition (step S400). The first initial operation condition is associated with an erase operation of the nonvolatile memory device, and the second initial operation condition is associated with a program operation of the nonvolatile memory device. For example, as will be described below with reference to FIG. 4, the first initial operation condition may include an erase threshold voltage distribution of memory cells depending on the erase operation, and an erasing time required to complete the erase operation. As will be described below with reference to FIG. 6, the second initial operation condition may include program threshold voltage distributions of the memory cells depending on the program operation, and a programming time required to complete the program operation.

A final operation condition is determined based on the first parameters, the second parameters, the first initial operation condition and the second initial operation condition (step S500). The final operation condition is associated with reliability of the nonvolatile memory device. For example, as will be described later with reference to FIG. 8, the final operation condition may include variations of threshold voltage distributions of the memory cells depending on an endurance test (e.g., repeating the program and erase operations) and/or a data retention test (e.g., repeating a read operation). Also, as will be described later with reference to FIG. 10, program verification voltages and read voltages may be adjusted as the threshold voltage distributions of the memory cells are varied.

An optimization verifying operation is performed to check whether the final operation condition is optimized and to generate a verifying result (step S600). If it is judged based on the verifying result that the final operation condition is optimized, the computer-implemented method of designing the nonvolatile memory device may be terminated. If it is judged based on the verifying result that the final operation condition is not optimized, at least one of design schemes for the nonvolatile memory device may be modified, and the final operation condition may be redetermined. In other words, if the final operation condition is not optimized, the first parameters, the second parameters, the first initial operation condition and/or the second initial operation condition may be modified, and the step S500 may be repeatedly performed. An example embodiment of such modifying the design schemes and redetermining the final operation condition will be described later with reference to FIG. 13.

A performance of a nonvolatile memory device is established based on various characteristics and parameters. To design a nonvolatile memory device having an optimized performance, a method of improving structural characteristics of the nonvolatile memory device, a method of improving operational conditions of the nonvolatile memory device, and a method of improving manufacturing conditions of the nonvolatile memory device have been proposed. These conventional methods are limited in realizing the optimization of the performance of the nonvolatile memory device. In addition, the conventional methods require a relatively long design time since some parameters are set and/or changed based on empirical knowledge of a designer.

In the computer-implemented method of designing the nonvolatile memory device according to some example embodiments, structural characteristics, operational conditions, and manufacturing conditions of the nonvolatile memory device are simultaneously improved by one design process. For example, the first parameters associated with the external environmental conditions, the second parameters associated with the structural characteristics and the internal environmental conditions, the first initial operation condition associated with the erase operation, the second initial operation condition associated with the program operation, and the final operation condition associated with the reliability may be concurrently determined. The optimization verifying operation may be performed to check whether the final operation condition is optimized. Thus, the designer may effectively design the nonvolatile memory device having optimized performance. In addition, the parameters and the conditions may be automatically set, determined, and/or changed, thereby reducing the time required to complete designing of the nonvolatile memory device.

Hereinafter, the computer-implemented method of designing the nonvolatile memory device according to example embodiments will be explained in detail with reference to example configurations of the flash memory device and the memory cell array.

Figure 2:
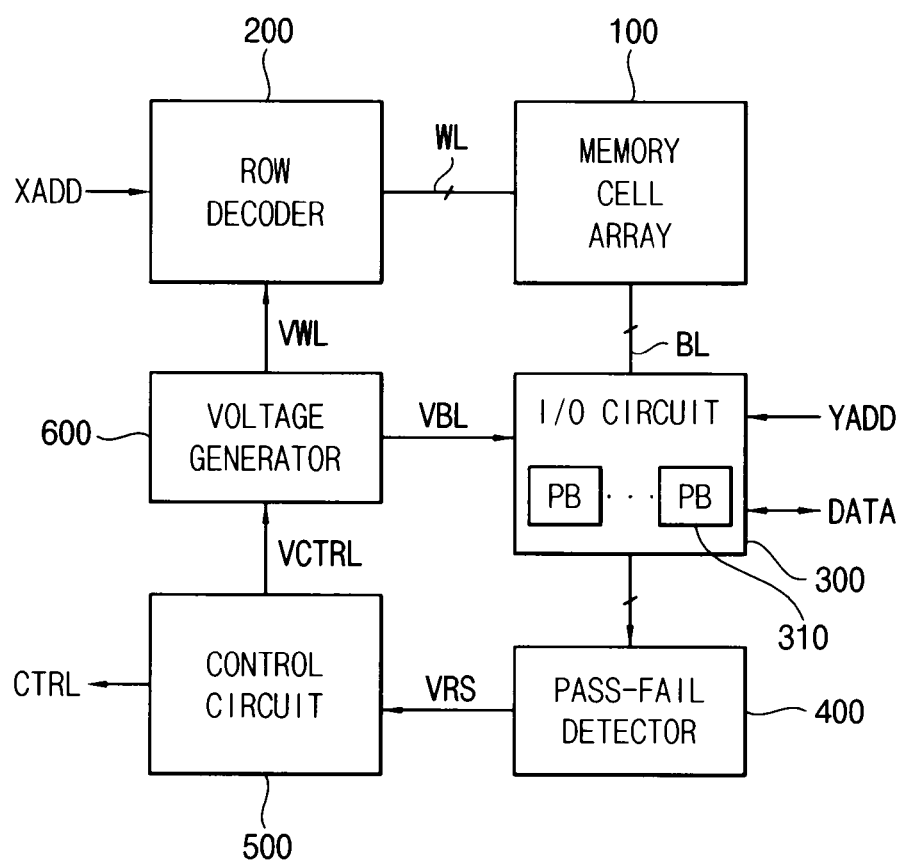
FIG. 2 is a block diagram illustrating a nonvolatile memory device for describing the method of FIG. 1.

FIG. 2 is a block diagram illustrating a nonvolatile memory device for describing the method of FIG. 1.

Referring to FIG. 2, a nonvolatile memory device 10 includes a memory cell array 100, a row decoder 200, an input/output (I/O) circuit 300, a pass-fail detector 400, a control circuit 500, and a voltage generator 600. The nonvolatile memory device 10 may be a flash memory device.

The memory cell array 100 includes a plurality of memory cells each of which is connected to a respective one of wordlines WL and a respective one of bitlines BL. The plurality of memory cells may include NAND flash memory cells or NOR flash memory cells, and may be arranged in a two-dimensional (2-D) array structure or a three-dimensional (3-D) vertical array structure (e.g., a vertical memory device having a stacked structure). Cell transistors may be connected in series between a bitline and a common source line in a NAND flash memory device, and cell transistors may be connected in parallel between a bitline and a common source line in a NOR flash memory device.

In an example embodiment, the plurality of memory cells may include single-level memory cells (SLC) in which only one bit is stored in each of the memory cells and/or multi-level memory cells (MLC) in which two or more bits are stored in each of the memory cells.

The row decoder 200 selects a wordline based on a row address XADD and consequently, a plurality of memory cells connected to the selected wordline are selected. In a program mode, a program voltage and a verification voltage may be sequentially applied to the selected wordline. In a read mode, a read voltage may be applied to the selected wordline. In an erase mode, an erase voltage may be applied to the selected wordline. Such wordline voltage VWL (e.g., the program voltage, the verification voltage, the read voltage, the erase voltage, and so on.) applied to the wordlines WL may be generated by the voltage generator 600 in response to a voltage control signal VCTRL provided from the control circuit 500.

The I/O circuit 300 is connected to the bitlines BL, and stores data to be written in the memory cell array 100 or data read out from the memory cell array 100. The I/O circuit 300 may include a plurality of page buffers 310 each of which is disposed corresponding to a respective one of the bitlines BL and includes a plurality of data latches. The I/O circuit 300 may operate as a sense amplifier or a write driver depending on the operation modes. For example, the I/O circuit 300 may operate as the sense amplifier during the read mode, and may operate as the write driver during the program mode. The I/O circuit 300 may further provide a function of a column decoder that selects the bitlines BL based on a column address YADD.

The I/O circuit 300 performs the program operation, a reading operation and an erase operation in response to a control signal CTRL provided from the control circuit 500. In the program mode, the I/O circuit 300 may load data provided from an external device and may apply a program permission voltage or a program inhibition voltage to each of bitlines BL based on the write data. As such, target memory cells which are currently to be programmed may correspond to the memory cells that are coupled to the selected wordline and the bitlines to which the program permission voltage is applied. The sensing operation may be performed after programming the target memory cells to determine whether the target memory cells are successfully programmed. The sensing operation may be performed by applying the verification voltage to the selected wordline. Such program and sensing operations may be repeated until a target state is completely programmed. In the read mode, the I/O circuit 300 may output read data by detecting voltages of bitlines BL. Operations of the I/O circuit 300 in the erase mode may be similar to the operations of the I/O circuit 300 in the program mode.

The pass-fail detector 400 generates a detection signal VRS which indicates whether at least one of the target memory cells corresponds to a failed program (or erase) state or all of the target memory cells correspond to normal program (or erase) states in the sensing operation of the program (or erase) mode.

The control circuit 500 generates the control signal CTRL for controlling overall operation of the nonvolatile memory device 10 and the voltage control signal VCTRL for controlling the voltage generator 600. For example, when the nonvolatile memory device 10 performs the program operation using incremental step pulse programming (ISPP), the voltage control signal VCTRL may include information about controlling the number of pulses, a generation timing of pulses, and a level of a start pulse. The control circuit 500 may determine whether programming is completed with respect to the target memory cells based on the detection signal VRS.

The voltage generator 600 generates the wordline voltage VWL and a bitline voltage VBL in response to the voltage control signal VCTRL. The wordline voltage VWL applied to the row decoder 200 may include the program voltage, the verification voltage, the read voltage, and the erase voltage. The bitline voltage VBL applied to the I/O circuit 300 may include the program permission voltage, the program inhibition voltage, and a precharge voltage.

Figure 3:
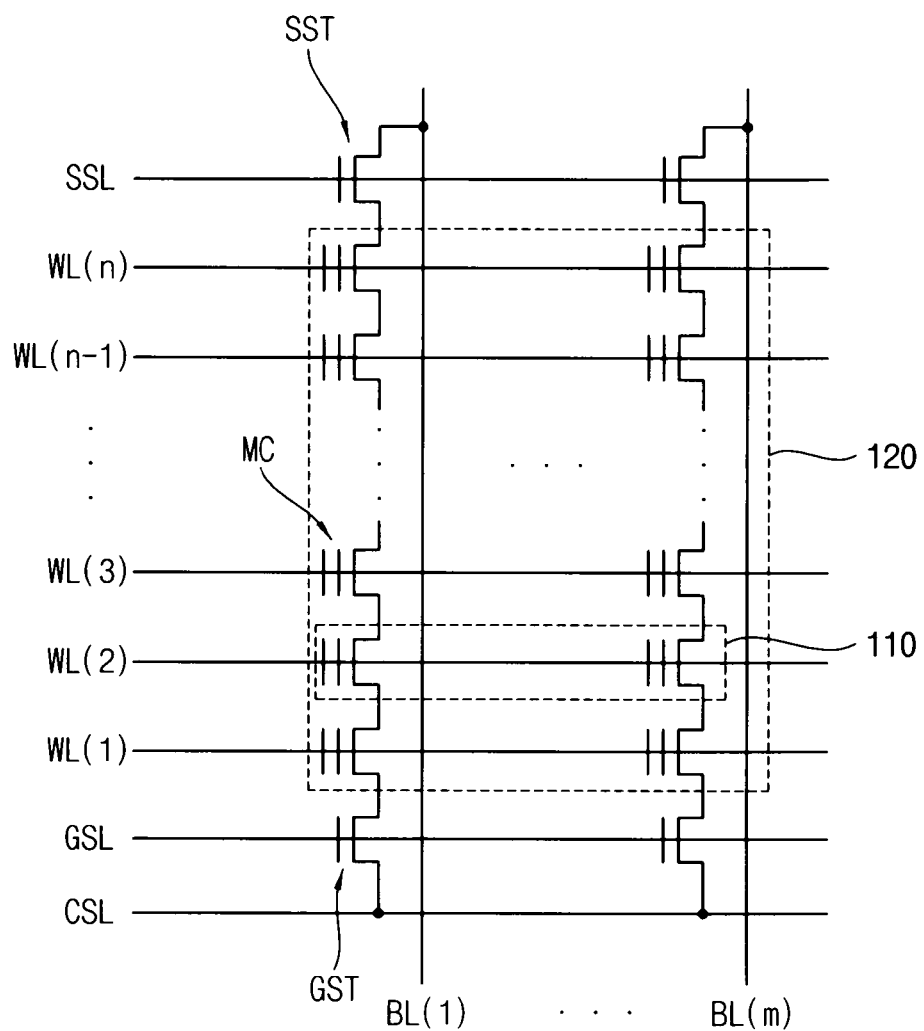
FIG. 3 is a diagram illustrating an example of a memory cell array included in the nonvolatile memory device of FIG. 2.

FIG. 3 is a diagram illustrating an example of a memory cell array included in the nonvolatile memory device of FIG. 2. FIG. 3 illustrates a memory cell array included in the NAND flash memory device.

Referring to FIG. 3, the memory cell array 100 may include string select transistors SST, ground select transistors GST and a plurality of memory cells MC. The string select transistors SST may be connected to bitlines BL(1), . . . , BL(m), and the ground select transistors GST may be connected to a common source line CSL. The memory cells MC may be connected in series between the string select transistors SST and the ground select transistors GST. Memory cells in the same row may be connected to the same wordline among wordlines WL(1), WL(2), WL(3), . . . , WL(n−1), WL(n). For example, 16, 32 or 64 wordlines may be disposed between a string select line SSL and a ground select line GSL.

The string select transistors SST may be connected to the string select line SSL, and may be controlled by a voltage on the string select line SSL. The ground select transistors GST may be connected to the ground select line GSL, and may be controlled by a voltage on the ground select line GSL. The memory cells MC may be controlled by a voltage on the wordlines WL(1), . . . , WL(n).

In the NAND flash memory device including the memory cell array 100, a read operation and a program operation may be performed per page 110, and an erase operation may be performed per block 120. According to example embodiments, each page buffer 310 of FIG. 2 may be connected to an odd-numbered bitline and an even-numbered bitline. In this case, the odd-numbered bitlines may form odd-numbered pages, the even-numbered bitlines may form even-numbered pages, and program operations for the odd-numbered pages and the even-numbered pages may be alternately performed.

Figure 4:
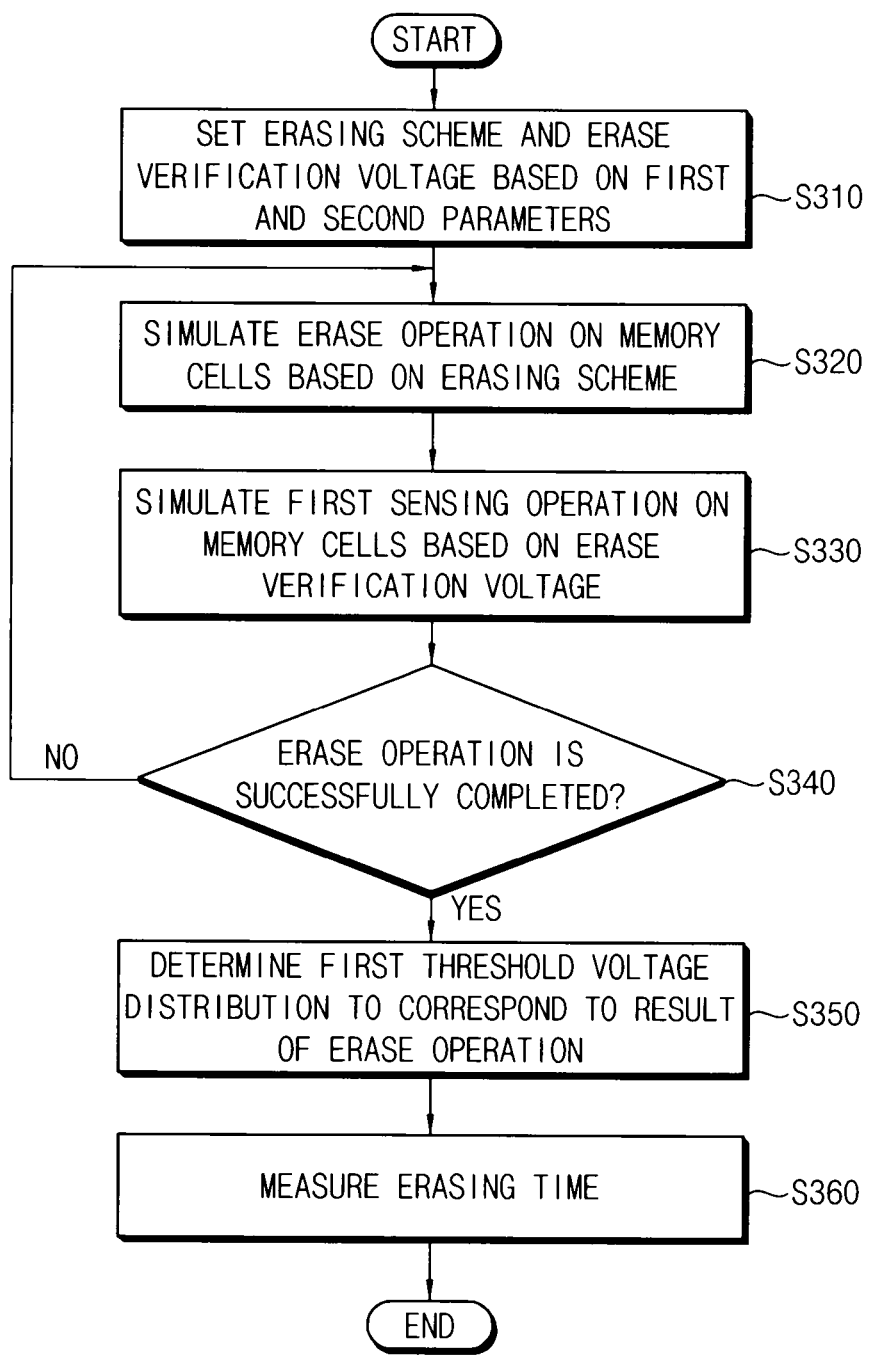
FIG. 4 is a flowchart illustrating an example of determining a first initial operation condition in FIG. 1.
Figure 5:
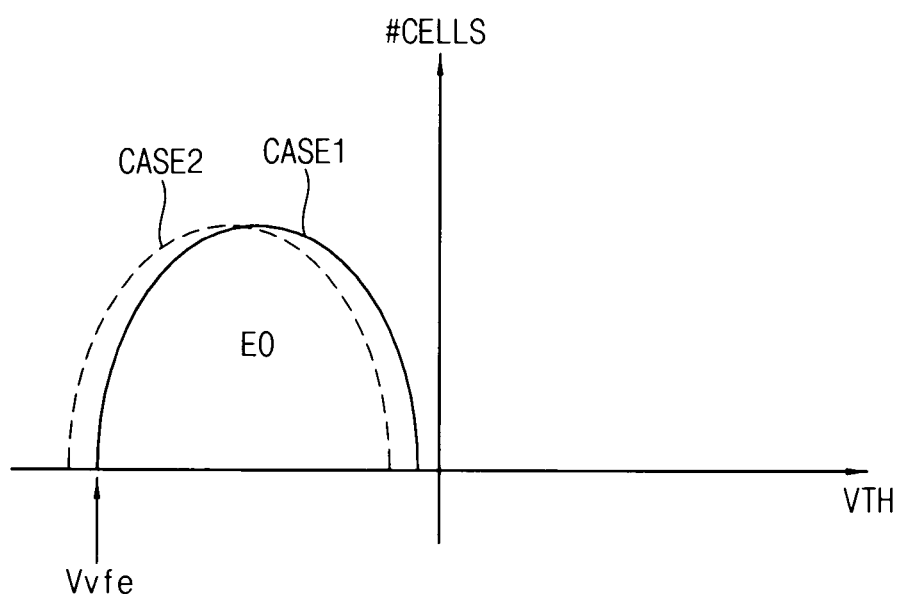
FIG. 5 is a diagram for describing the example of FIG. 4.

FIG. 4 is a flowchart illustrating an example of determining a first initial operation condition in FIG. 1. FIG. 5 is a diagram for describing the example of FIG. 4.

Referring to FIGS. 2, 3, 4 and 5, in the step S300, an erasing scheme and an erase verification voltage Vvfe may be set based on the first parameters and the second parameters (step S310). For example, the erasing scheme and the erase verification voltage Vvfe may be set by considering the target erasing speed, a saturation effect depending on the erase operation, and virgin states of the memory cells MC depending on manufacturing and structural characteristics, and so on.

In an example embodiment, the nonvolatile memory device 10 may perform the erase operation based on at least one of various erasing schemes. For example, the erase operation may be performed by using one of normal pulse erasing, one-shot pulse erasing, incremental step pulse erasing (ISPE), and so on. As another example, the erase operation may be performed in various manners depending on erasing orders of blocks 120, pages 110 and/or memory cells MC.

The erase operation may be computer simulated on the memory cells MC based on the erasing scheme that is set in the step S310 (step S320), and a first sensing operation may be computer simulated on the memory cells MC based on the erase verification voltage Vvfe that is set in the step S310 to generate a first sensing result (step S330). For example, the erase operation and the first sensing operation may be computer simulated based on an erase simulation model.

In an example embodiment, the erase simulation model may be implemented by modeling the internal elements (e.g., transistors, resistors, capacitors, and so on.) included in the nonvolatile memory device 10, and by modeling the determination criterions (e.g., the erasing scheme and the erase verification voltage Vvfe) for the first initial operation condition. In another example embodiment, the erase simulation model may be implemented with a form of a first polynomial expression that is obtained based on results generated by the TCAD and results measured by the TEG.

A first threshold voltage distribution E0 of the memory cells MC may be determined based on the first sensing result. The first threshold voltage distribution E0 may correspond to the first initial operation condition. Particularly, it is judged based on the first sensing result whether the erase operation is successfully completed (step S340). If it is judged that at least one of the memory cells MC is incompletely erased, the erase operation and the first sensing operation may be repeatedly simulated. In other words, if threshold voltages of some of the memory cells MC are lower than the erase verification voltage Vvfe (e.g., CASE2 in FIG. 5), the steps S320 and S330 may be repeated. If it is judged that all of the memory cells MC are completely erased, in other words, threshold voltages of all of the memory cells MC are higher than the erase verification voltage Vvfe (e.g., CASE1 in FIG. 5), the first threshold voltage distribution E0 may be determined to correspond to the result of the erase operation (step S350). For example, the first threshold voltage distribution E0 may be determined as CASE1 which is marked with a solid line in FIG. 5.

In an example embodiment, the first threshold voltage distribution E0 may be determined by computer simulating the erase operation and the first sensing operation on all of the memory cells MC. In another example embodiment, the first threshold voltage distribution E0 may be determined by computer simulating the erase operation and the first sensing operation on some of the memory cells MC, and by predicting a threshold voltage distribution of all of the memory cells MC based on the simulation result for the some of the memory cells MC.

An erasing time may be further measured (step S360). The erasing time may indicate a time required to complete the erase operation and the first sensing operation. In this case, both the first threshold voltage distribution E0 and the erasing time may correspond to the first initial operation condition.

Figure 6:
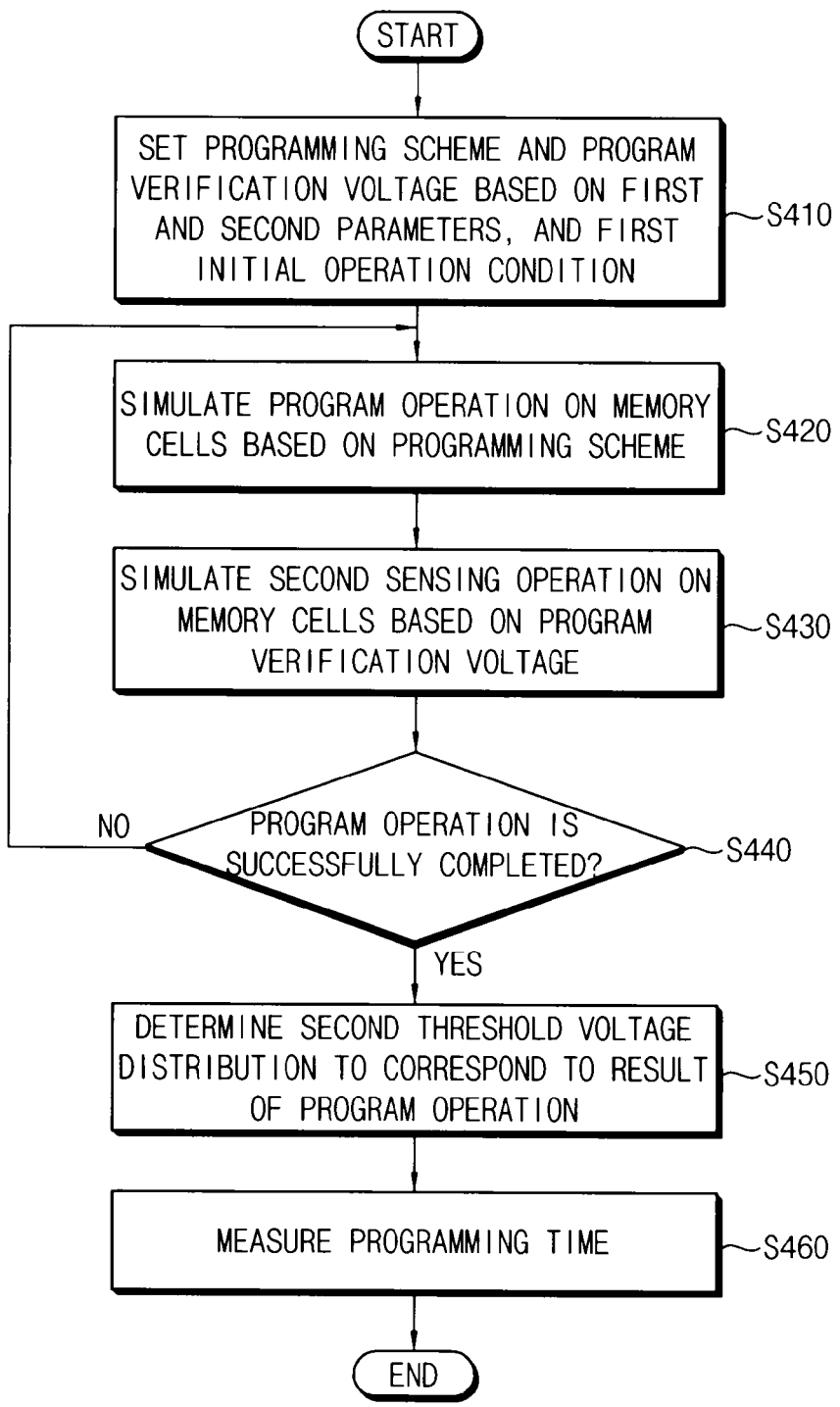
FIG. 6 is a flowchart illustrating an example of determining a second initial operation condition in FIG. 1.
Figure 7:
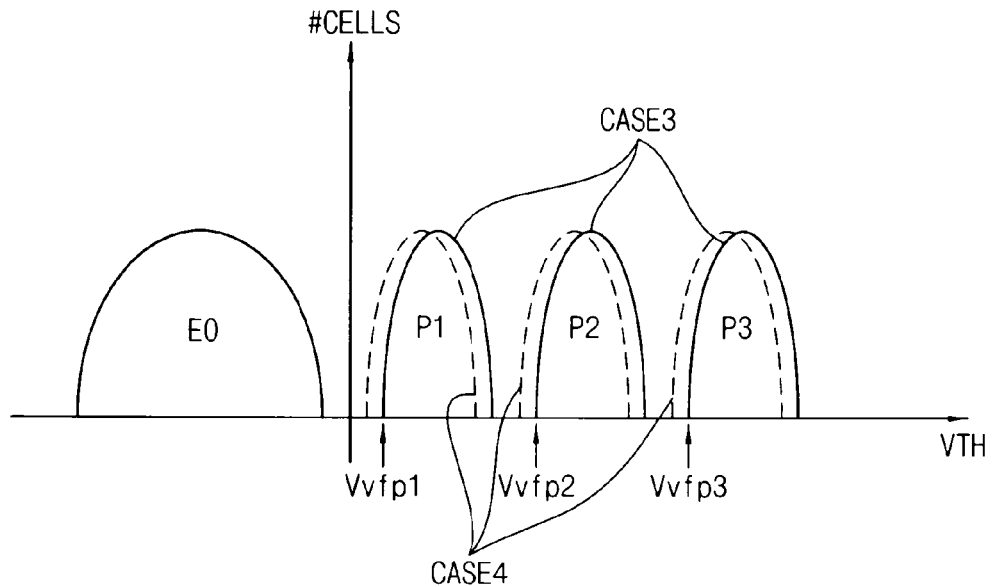
FIG. 7 is a diagram for describing the example of FIG. 6.

FIG. 6 is a flowchart illustrating an example of determining a second initial operation condition in FIG. 1. FIG. 7 is a diagram for describing the example of FIG. 6. In FIG. 7, the memory cells may be the MLCs in which two bits are stored in each of memory cells.

Referring to FIGS. 2, 3, 6 and 7, in the step S400, a programming scheme and program verification voltages Vvfp1, Vvfp2, Vvfp3 may be set based on the first parameters, the second parameters, and the first initial operation condition (step S410). For example, the programming scheme and the program verification voltages Vvfp1, Vvfp2, Vvfp3 may be set by considering an interference effect and a disturbance effect between adjacent memory cells, the target programming speed, a saturation effect depending on the program operation, and a current flowing through the memory cell array 100, and so on. The interference effect may indicate that a threshold voltage of a memory cell is varied due to an electromagnetic field, mechanical vibration and/or thermal interference of adjacent memory cells. The disturbance effect may indicate that a threshold voltage of a memory cell is varied by changing characteristics of the memory cell itself due to a charge injection and/or a change of material.

In an example embodiment, the nonvolatile memory device 10 may perform the program operation based on one of various programming schemes. For example, the program operation may be performed by using one of normal pulse programming, one-shot pulse programming, incremental step pulse programming (ISPP), and so on. As another example, the program operation may be performed in various manners depending on programming orders of pages 110 and/or memory cells MC. In another example embodiment, if the memory cells MC are the MLCs, the memory cells MC may be programmed using one of a shadow programming method, a reprogramming method or an on-chip buffered programming method.

The program operation may be computer simulated on the memory cells MC based on the programming scheme that is set in the step S410 (step S420), and a second sensing operation may be computer simulated on the memory cells MC based on the program verification voltages Vvfp1, Vvfp2, Vvfp3 that are set in the step S410 to generate a second sensing result (step S430). For example, the program operation and the second sensing operation may be computer simulated based on a program simulation model.

In an example embodiment, the program simulation model may be implemented by modeling the internal elements in the nonvolatile memory device 10, by modeling the determination criterions for the first initial operation condition, and by modeling the determination criterions (e.g., the programming scheme and the program verification voltages Vvfp1, Vvfp2, Vvfp3) for the second initial operation condition. In another example embodiment, the program simulation model may be implemented with a form of a second polynomial expression that is obtained based on results generated by the TCAD and results measured by the TEG.

Second threshold voltage distributions P1, P2, P3 of the memory cells MC may be determined based on the second sensing result. The second threshold voltage distributions P1, P2, P3 may correspond to the second initial operation condition. Particularly, it is judged based on the second sensing result whether the program operation is successfully completed (step S440). If it is judged that at least one of the memory cells MC is incompletely programmed, the program operation and the second sensing operation are repeatedly simulated. In other words, if threshold voltages of some of the memory cells MC are lower than the program verification voltages Vvfp1, Vvfp2, Vvfp3 (e.g., CASE4 in FIG. 7), the steps S420 and S430 may be repeated. If it is judged that all of the memory cells MC are completely programmed, in other words, threshold voltages of all of the memory cells MC are higher than the program verification voltages Vvfp1, Vvfp2, Vvfp3 (e.g., CASE3 in FIG. 7), the second threshold voltage distributions P1, P2, P3 may be determined to correspond to the result of the program operation (step S450). For example, the second threshold voltage distributions P1, P2, P3 may be determined as CASE3 which are marked with a solid line in FIG. 7.

In an example embodiment, the second threshold voltage distributions P1, P2, P3 may be determined by computer simulating the program operation and the second sensing operation on all of the memory cells MC. In another example embodiment, the second threshold voltage distributions P1, P2, P3 may be determined by computer simulating the program operation and the second sensing operation on some of the memory cells MC, and by predicting threshold voltage distributions of all of the memory cells MC based on the simulation result for the some of the memory cells MC.

A programming time may be further measured (step S460). The programming time may indicate a time required to complete the program operation and the second sensing operation. In this case, both the second threshold voltage distributions P1, P2, P3 and the programming time may correspond to the second initial operation condition.

According to example embodiments, if the memory cells MC are the MLCs, X bits may be stored in each of the memory cells MC, where X is a natural number equal to or greater than two. In this embodiment, $(2^x-1)$ program verification voltages may be used to simulate the second sensing operation and to verify $2^x$ distinctive threshold voltage distributions.

Figure 8:
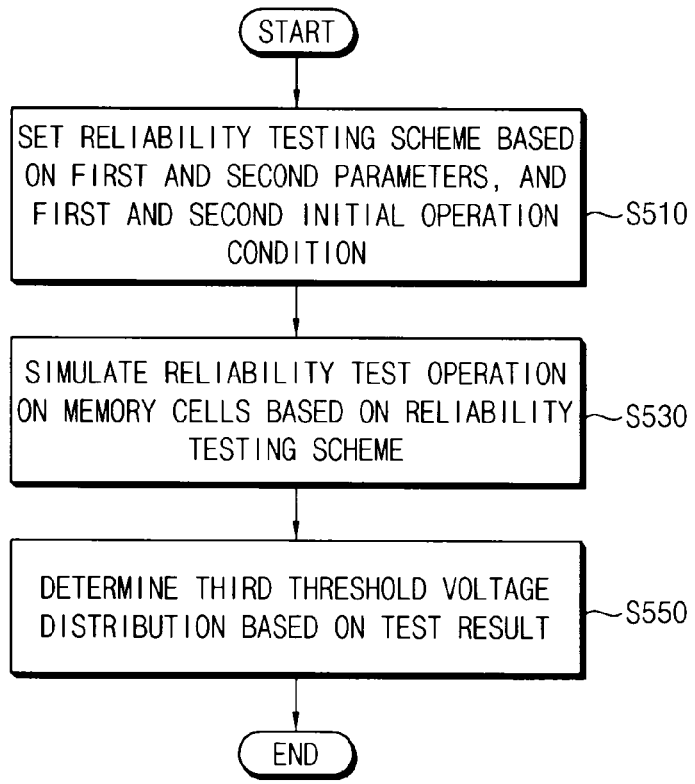
FIG. 8 is a flowchart illustrating an example of determining a final operation condition in FIG. 1.
Figure 9A:
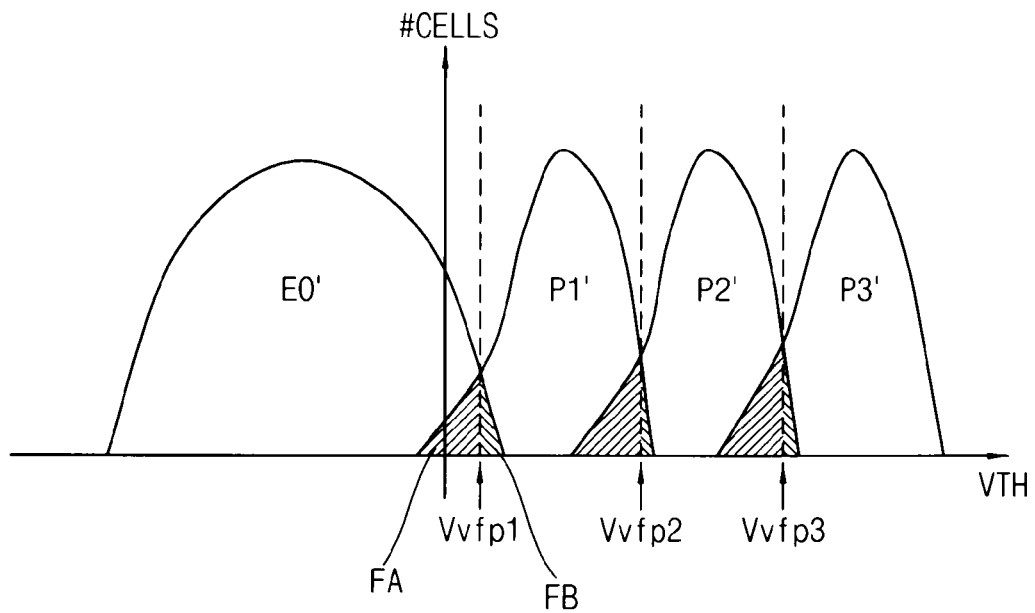
FIGS. 9A and 9B are diagrams for describing the example of FIG. 8.
Figure 9B:
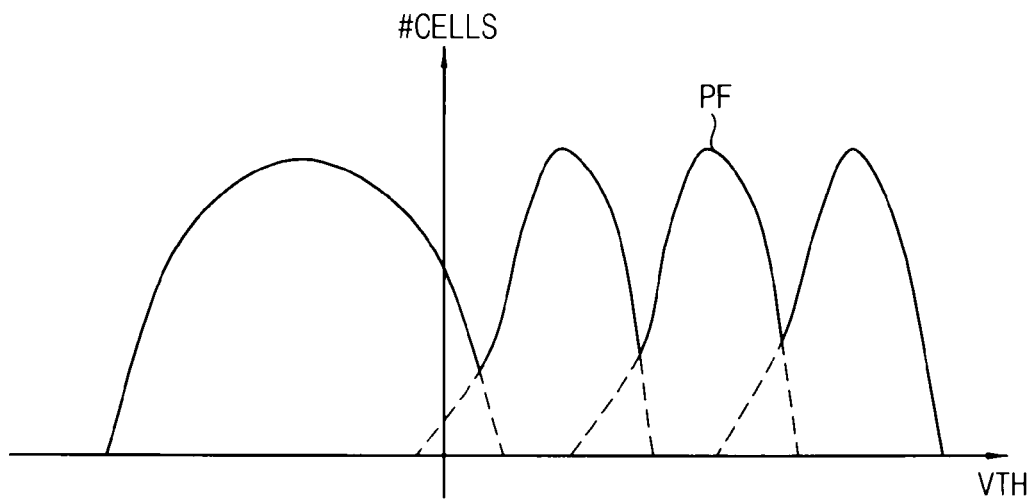

FIG. 8 is a flowchart illustrating an example of determining a final operation condition in FIG. 1. FIGS. 9A and 9B are diagrams for describing the example of FIG. 8. FIG. 9A illustrates variations (e.g., degradations) of threshold voltage distributions depending on a reliability test. FIG. 9B illustrates final threshold voltage distributions that is determined based on the reliability test performed in FIG. 9A.

Referring to FIGS. 2, 3, 7, 8, 9A and 9B, in the step S500, a reliability testing scheme may be set based on the first parameters, the second parameters, the first initial operation condition and the second initial operation condition (step S510). For example, a reliability test may include an endurance test that repeats the program and erase operation and analyzes variations of the threshold voltage distributions depending on such repeating, and a data retention test that repeats the read operation and analyzes variations of the threshold voltage distributions depending on such repeating. The reliability testing scheme may be set by considering a charge loss of the memory cells by lapse of time, and a degradation of characteristic of a gate voltage to a drain current (Vg-Id) by lapse of time, and so on.

A reliability test operation may be computer simulated on the memory cells MC based on the reliability testing scheme that is set in the step S510 to generate a test result (step S530). For example, the reliability test operation may be computer simulated based on a reliability simulation model. According to example embodiments, as will be described below with reference to FIGS. 10 and 11, levels of the program verification voltages Vvfp1, Vvfp2, Vvfp3 may be adjusted to correspond to the variations of threshold voltage distributions, thereby optimizing performance of the nonvolatile memory device 10. Read voltages that are substantially the same as the program verification voltages Vvfp1, Vvfp2, Vvfp3 may also be adjusted to correspond to the variations of threshold voltage distributions.

In an example embodiment, the reliability simulation model may be implemented by modeling the internal elements in the nonvolatile memory device 10, by modeling characteristics with respect to the threshold voltage distributions, such as the erasing scheme, the erase verification voltage Vvfe, the programming scheme, and the program verification voltages Vvfp1, Vvfp2, Vvfp3, and by modeling characteristics with respect to operation time, such as the erasing time, the programming time, the number of the erase operation, the number of the program operation, and a data retention time. In another example embodiment, the reliability simulation model may be implemented with a form of a third polynomial expression that is obtained based on results generated by the TCAD and results measured by the TEG.

A third threshold voltage distribution PF of the memory cells MC may be determined based on the test result (step S550). The third threshold voltage distribution PF may correspond to the final operation condition. As illustrated in FIG. 9A, the threshold voltage distributions E0', P1', P2', P3' after the reliability test operation may be varied (e.g., degraded) in comparison with the first threshold voltage distribution (e.g., E0 in FIG. 7) and the second threshold voltage distributions (e.g., P1, P2, P3 in FIG. 7). In FIG. 9A, reference numeral FA represents fail bits that are programmed in a first state (e.g., P1 in FIG. 7) but are read as an erase state (e.g., E0 in FIG. 7) after the reliability test operation. Reference numeral FB represents fail bits that are programmed in the erase state (e.g., E0 in FIG. 7) but are read as the first state (e.g., P1 in FIG. 7) after the reliability test operation. As illustrated in FIG. 9B, the third threshold voltage distribution PF may be determined based on the threshold voltage distributions E0', P1', P2', P3' in FIG. 9A.

In an example embodiment, the third threshold voltage distribution PF may be determined by computer simulating the reliability test operation on all of the memory cells MC. In another example embodiment, the third threshold voltage distributions PF may be determined by computer simulating the reliability test operation on some of the memory cells MC, and by predicting the threshold voltage distribution of all of the memory cells MC based on the simulation result for the some of the memory cells MC.

Figure 10:
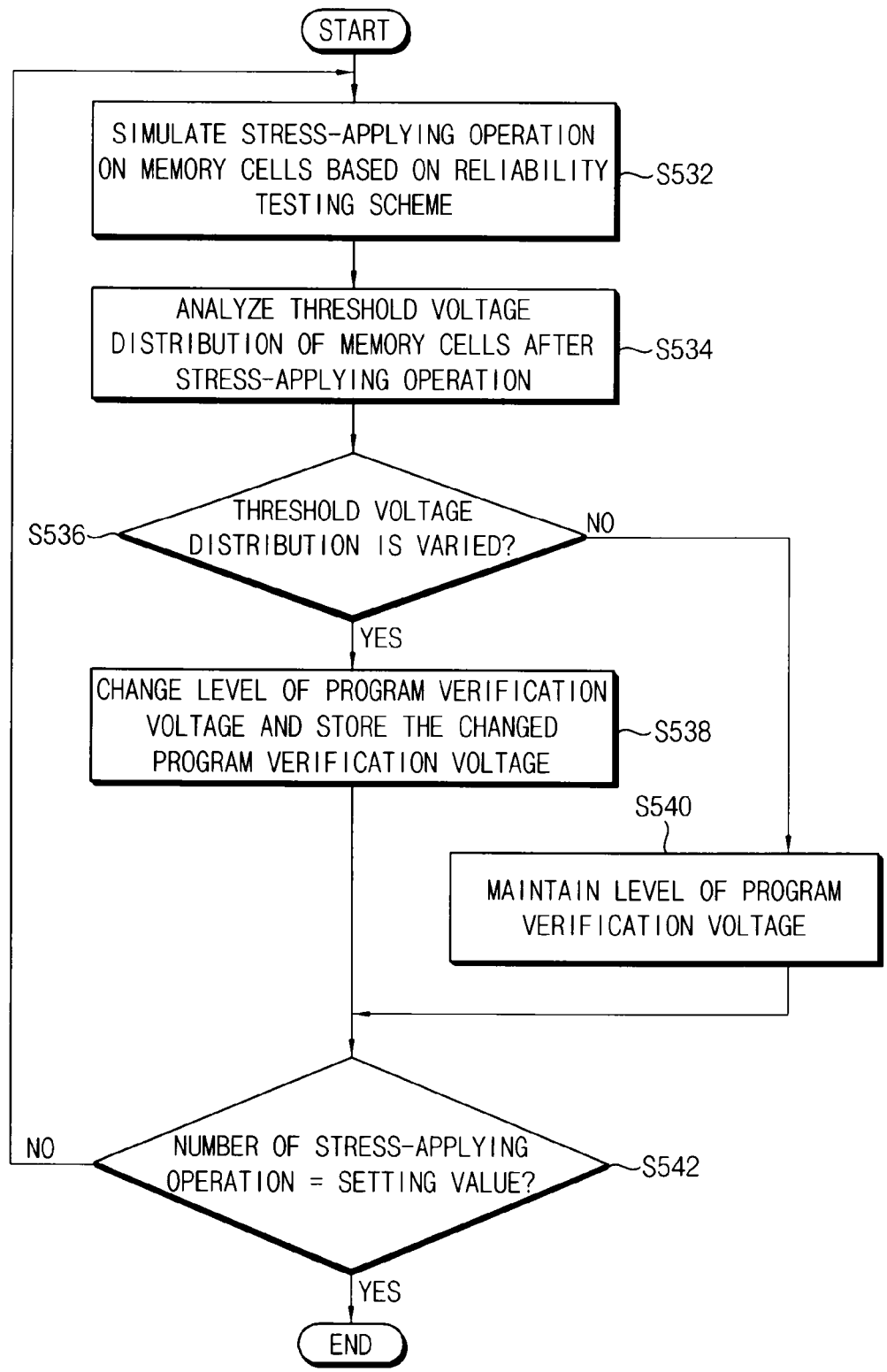
FIG. 10 is a flowchart illustrating an example of computer simulating a reliability test operation in FIG. 8.
Figure 11:
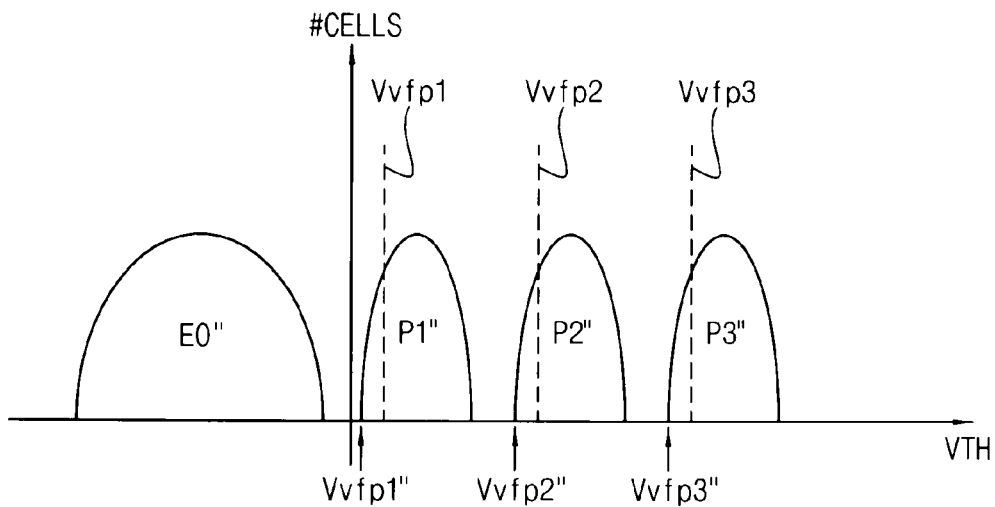
FIG. 11 is a diagram for describing the example of FIG. 10.

FIG. 10 is a flowchart illustrating an example of computer simulating a reliability test operation in FIG. 8. FIG. 11 is a diagram for describing the example of FIG. 10. In an example embodiment of FIGS. 10 and 11, the program verification voltages may be adjusted to correspond to the variations of threshold voltage distributions.

Referring to FIGS. 2, 3, 7, 8, 10 and 11, in the step S530, a stress-applying operation may be computer simulated on the memory cells MC based on the reliability testing scheme that is set in the step S510 (step S532). For example, the memory cells MC may be stressed or degraded by repeating the program and erase operations, or by repeating the read operation after the program operation.

After the stress-applying operation, the threshold voltage distributions of the memory cells MC may be analyzed to generate an analysis result (step S534), and the levels of the program verification voltages Vvfp1, Vvfp2, Vvfp3 may be selectively adjusted based on the analysis result. Particularly, it is judged based on the analysis result whether the threshold voltage distributions of the memory cells MC are varied as the stress-applying operation is performed (step S536). If it is judged that the threshold voltage distributions of the memory cells MC are varied, in other words, if it is judged that the threshold voltage distributions of the memory cells MC after the stress-applying operation is different from the second threshold voltage distributions P1, P2, P3, the levels of the program verification voltages Vvfp1, Vvfp2, Vvfp3 may be changed, and the changed program verification voltages may be stored (step S538). In this case, the read voltages may also be changed to correspond to the variations of the threshold voltage distributions. If it is judged that the threshold voltage distributions of the memory cells MC are not varied, in other words, if it is judged that the threshold voltage distributions of the memory cells MC after the stress-applying operation is substantially the same as the second threshold voltage distributions P1, P2, P3, the levels of the program verification voltages Vvfp1, Vvfp2, Vvfp3 may be maintained (step S540).

As illustrated in FIG. 11, the threshold voltage distributions E0", P1", P2", P3" after the stress-applying operation may be varied (e.g., degraded) in comparison with the first threshold voltage distribution (e.g., E0 in FIG. 7) and the second threshold voltage distributions (e.g., P1, P2, P3 in FIG. 7). To optimize the program operation and/or the read operation after the stress-applying operation, the levels of the program verification voltages Vvfp1, Vvfp2, Vvfp3 may be changed to correspond to the varied threshold voltage distributions E0", P1", P2", P3" after the stress-applying operation. The nonvolatile memory device 10 may perform the program (or read) operation based on the changed and optimized program verification voltages (or read voltages) Vvfp1", Vvfp2", Vvfp3" after the predetermined number of the program (or read) operations are performed, thereby reducing fail bits.

It is judged whether the number of the stress-applying operation is substantially the same as a predetermined setting value (step S542). If it is judged that the number of the stress-applying operation is smaller than the setting value, the steps S532, S534, S536, S538 and S540 may be repeated. If it is judged that the number of the stress-applying operation is substantially the same as the setting value, the simulation of the reliability test operation may be terminated. It is assumed that the reliability test operation correspond to the data retention test, the setting value may correspond to the number (e.g., about 100,000) of read operations that complies with a reliability criterion. In this embodiment, the read operation may be repeated up to the setting value, the threshold voltage distributions may be analyzed per every read operation, and thus optimized profiles for the program verification voltages may be determined depending on the number of the read operations. In another embodiment, the threshold voltage distributions may be analyzed per predetermined interval (e.g., per about 1000 read operation), and thus a testing time may be reduced.

Figure 12:
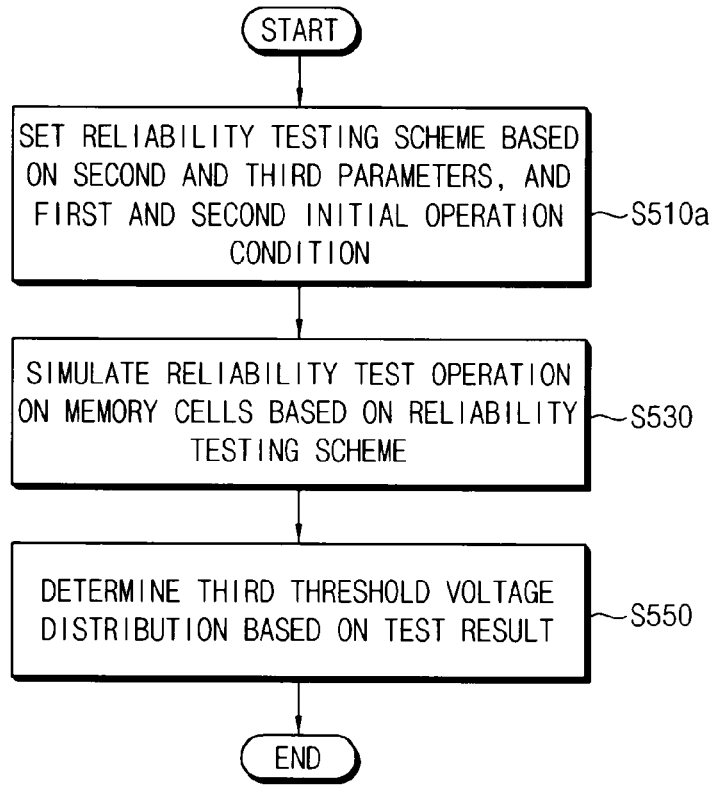
FIG. 12 is a flowchart illustrating another example of determining a final operation condition in FIG. 1.

FIG. 12 is a flowchart illustrating another example of determining a final operation condition in FIG. 1.

Referring to FIG. 12, in the step S500, a reliability testing scheme may be set based on the second parameters, third parameters, the first initial operation condition and the second initial operation condition (step S510a). The third parameters may be associated with second external environmental conditions that are different from the external environmental conditions for the first parameters. The second external environmental conditions may indicate more severe circumstances than the circumstances in a place where the nonvolatile memory device is mounted and/or used. For example, the third parameters may include a temperature that is higher or lower than the operating temperature, a humidity that is higher than the operating humidity, and a pressure that is higher than the operating pressure, and so on. As described above with reference to FIG. 8, the reliability test may include the endurance test and the data retention test, and the reliability testing scheme may be set by considering the charge loss, and the degradation of Vg-Id characteristic, and so on.

A reliability test operation may be computer simulated on the memory cells based on the reliability testing scheme to generate a test result (step S530), and a third threshold voltage distribution of the memory cells may be determined based on the test result (step S550). The steps S530 and S550 may be substantially the same as the steps S530 and S550 in FIG. 8, respectively.

Figure 13A:
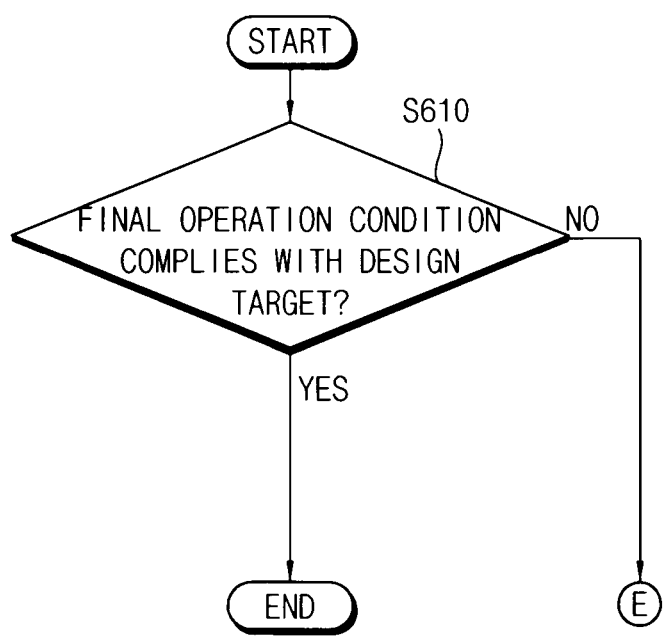
FIGS. 13A and 13B are flowcharts illustrating an example of performing an optimization verifying operation in FIG. 1.
Figure 13B:
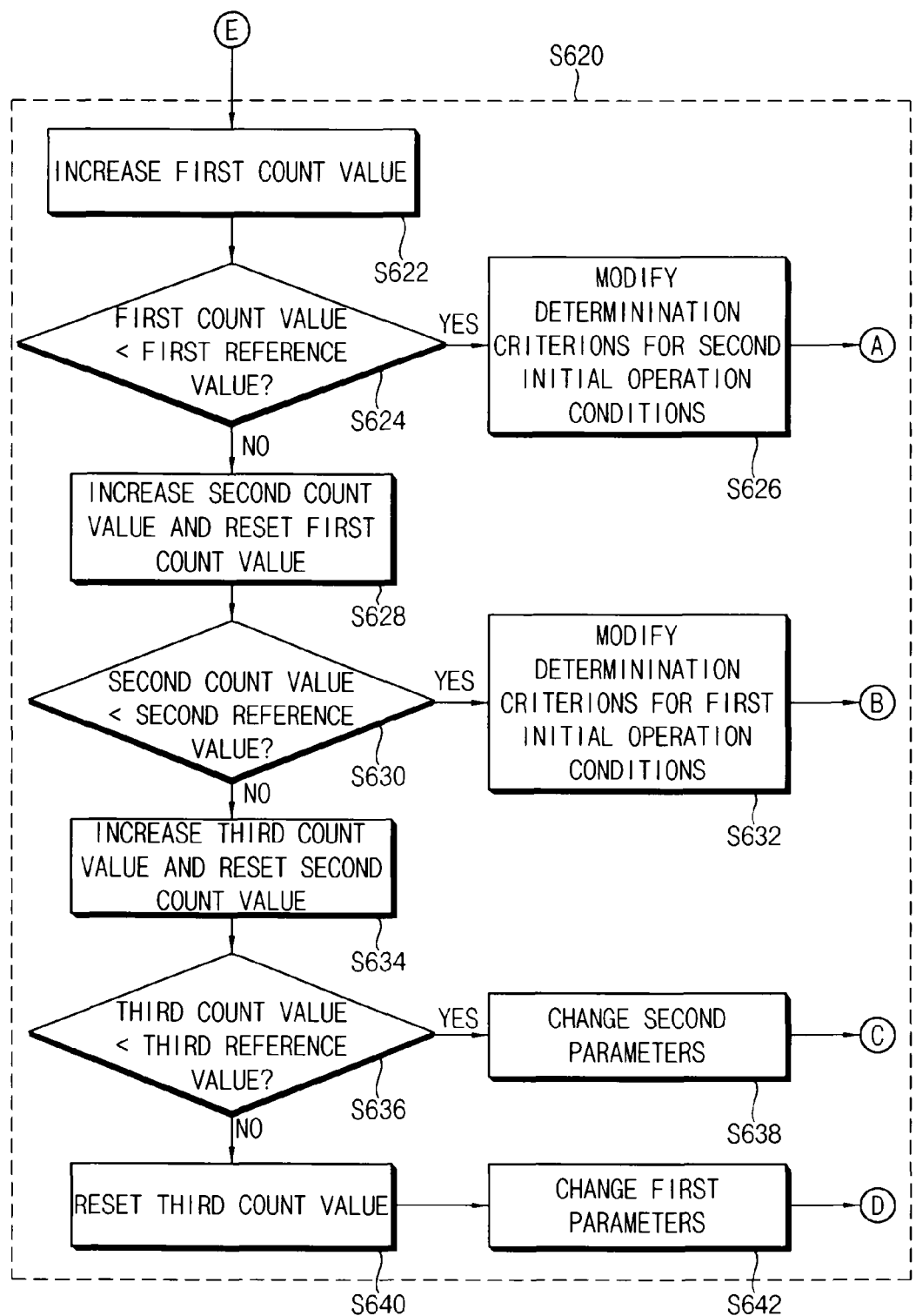

FIGS. 13A and 13B are flowcharts illustrating an example of performing an optimization verifying operation in FIG. 1.

Referring to FIGS. 13A and 13B, in the step S600, it is checked whether the final operation condition complies with the design target of the nonvolatile memory device to generate a check result (step S610). As described above, the design target may include the tolerance with respect to the ECC, the target erasing speed, the target programming speed, and the reliability test conditions. For example, it is checked whether the final operation condition complies with the design target by judging whether the number of fail bits obtained by the third threshold voltage distribution (e.g., PF in FIG. 9B) is smaller than the tolerance with respect to the ECC, whether the target erasing speed and the target programming speed are achieved, and/or whether the third threshold voltage distribution (e.g., PF in FIG. 9B) complies with the reliability test conditions.

If it is judged that the final operation condition complies with the design target, in other words, if it is judged that the final operation condition is optimized, the computer-implemented method of designing the nonvolatile memory device may be terminated. If it is judged that the final operation condition does not comply with the design target, at least one of design schemes for the nonvolatile memory device may be modified, and the step S500 may be repeated. In other words, if it is judged that the final operation condition is not optimized, at least one of the first and second parameters and the determination criterions for the first and second initial operation conditions may be modified (step S620), and the final operation condition may be redetermined based on at least one of the modified parameters and the modified determination criterions. For example, at least one of the first and second parameters and the determination criterions for the first and second initial operation conditions may be selectively modified based on a first reference value, a second reference value, a third reference value, the check result, a first count value, a second count value and a third count value.

The first, second and third count values may be changed as the redetermination number of the final operation condition increases.

Particularly, if the final operation condition is not optimized, the first count value may be increased (step S622), and the first count value may be compared with the first reference value (step S624). If the first count value is smaller than the first reference value, the determination criterions for the second initial operation conditions may be modified (step S626), and the final operation condition may be redetermined by repeating the steps S400 and S500 in FIG. 1. The determination criterions for the second initial operation conditions may correspond to the programming scheme and the program verification voltage. The first reference value may correspond to the number of changeable determining criterions for the second initial operation conditions.

If the first count value is substantially the same as the first reference value, in other words, if the final operation condition is not optimized even though all of the determination criterions for the second initial operation conditions are applied, the second count value may be increased and the first count value may be reset (step S628), and the second count value may be compared with the second reference value (step S630). If the second count value is smaller than the second reference value, the determination criterions for the first initial operation conditions may be modified (step S632), and the final operation condition may be redetermined by repeating the steps S300, S400 and S500 in FIG. 1. The determination criterions for the first initial operation conditions may correspond to the erasing scheme and the erase verification voltage. The second reference value may correspond to the number of changeable determining criterions for the first initial operation conditions.

If the second count value is substantially the same as the second reference value, in other words, if the final operation condition is not optimized even though all of the determination criterions for the first and second initial operation conditions are applied, the third count value may be increased and the second count value may be reset (step S634), and the third count value may be compared with the third reference value (step S636). If the third count value is smaller than the third reference value, the second parameters may be changed (step S638), and the final operation condition may be redetermined by repeating the steps S300, S400 and S500 in FIG. 1. The third reference value may correspond to the number of changeable second parameters.

If the third count value is substantially the same as the third reference value, in other words, if the final operation condition is not optimized even though all of the determination criterions for the first and second initial operation conditions and the second parameters are applied, the third count value may be reset (step S640). The first parameters may be changed (step S642), and the final operation condition may be redetermined by repeating the steps S200, S300, S400 and S500 in FIG. 1.

In the computer-implemented method of designing the nonvolatile memory device according to some example embodiments, all of design schemes for the nonvolatile memory device may be simultaneously checked by one design process, thereby reducing the time required to complete designing of the nonvolatile memory device.

Figure 14:
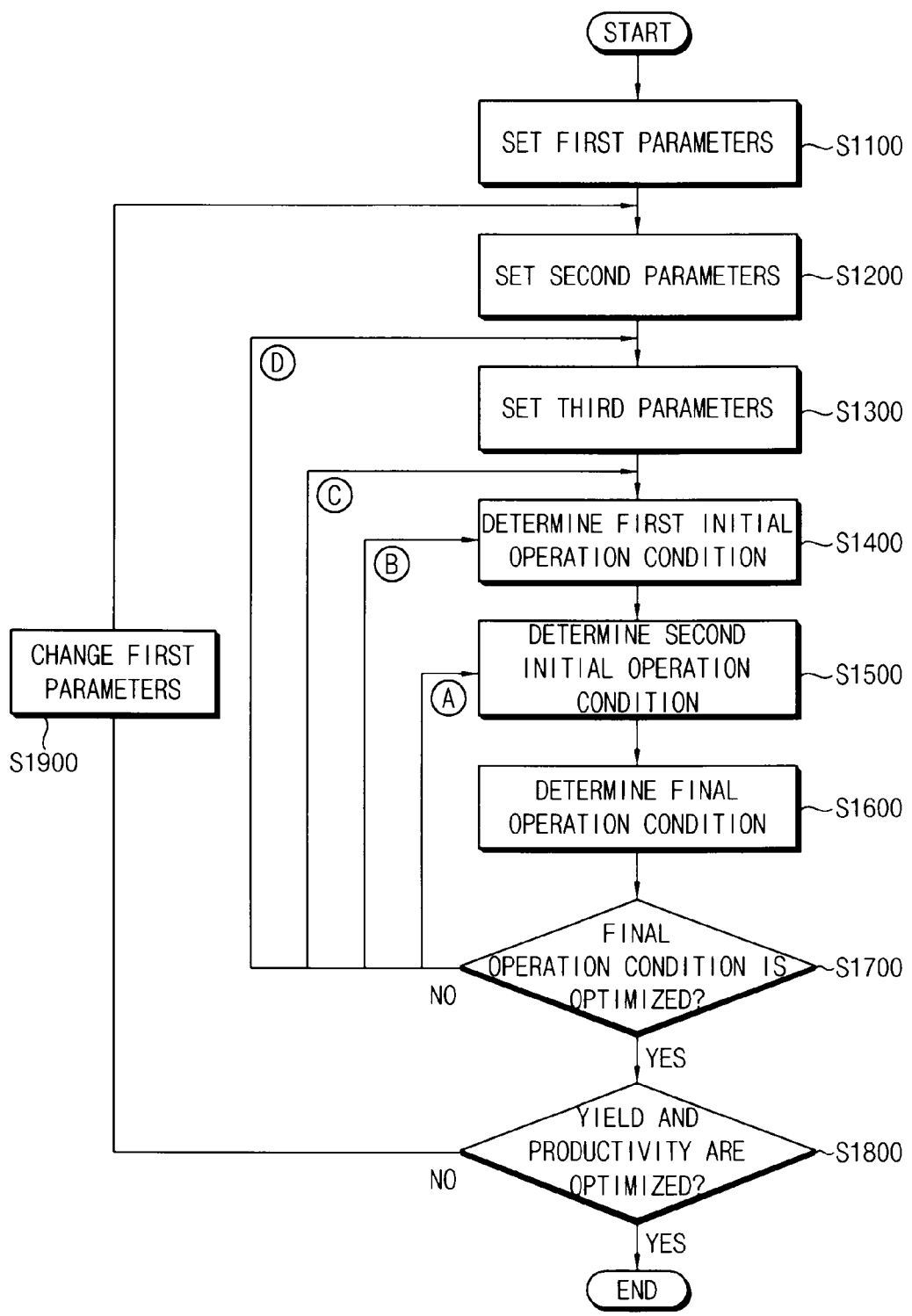
FIG. 14 is a flowchart illustrating a computer-implemented method of designing a nonvolatile memory device according to other example embodiments.

FIG. 14 is a flowchart illustrating a computer-implemented method of designing a nonvolatile memory device according to other example embodiments.

Referring to FIG. 14, in the computer-implemented method of designing the nonvolatile memory device, first parameters are set (step S1100), second parameters are set (step S1200), and third parameters are set (step S1300). A manufacturing process of the nonvolatile memory device may include a wafer-level process and a chip-level process. The first parameters are associated with structural characteristics of the nonvolatile memory device in a wafer-level. The first parameters may be further associated with a design target and/or manufacturing conditions. The second parameters are associated with external environmental conditions of the nonvolatile memory device. The third parameters are associated with structural characteristics of the nonvolatile memory device in a chip-level and internal environmental conditions of the nonvolatile memory device.

The first parameters may include a size of a wafer including the nonvolatile memory device, and the number of the nonvolatile memory device included in the wafer, and so on. The first parameters may further include design target parameters such as a tolerance with respect to the ECC, a target erasing speed, a target programming speed, a target yield and a target productivity, and manufacturing parameters such as a manufacturing temperature and a manufacturing pressure. The second parameters may include an operating temperature, an operating humidity, and an operating pressure, and so on. The third parameters may include structural parameters such as a size, a channel width, a channel length, and a critical dimension of an internal element (e.g., a transistor) included in the nonvolatile memory device, and may include an operating voltage, and heat and stress of the internal element caused by an operation of the nonvolatile memory device. The first, second and third parameters may be provided from a manufacturing process by using the TEG, or may be provided from the TCAD program by a designer.

The steps S1200 and S1300 may be substantially the same as the steps S100 and S200 in FIG. 1, respectively.

A first initial operation condition is determined based on the first, second and third parameters (step S1400), a second initial operation condition is determined based on the first, second and third parameters and the first initial operation condition (step S1500), and a final operation condition is determined based on the first, second and third parameters, and the first and second initial operation conditions (step S1600). The first initial operation condition is associated with an erase operation of the nonvolatile memory device. The second initial operation condition is associated with a program operation of the nonvolatile memory device. The final operation condition is associated with reliability of the nonvolatile memory device. A first optimization verifying operation is performed to check whether the final operation condition is optimized and to generate a first verifying result (step S1700). A second optimization verifying operation is performed to check whether a yield and a productivity of the nonvolatile memory device are optimized and to generate a second verifying result (step S1800).

The steps S1400, S1500, S1600 and S1700 may be substantially the same as the steps S300, S400, S500 and S600 in FIG. 1, respectively.

If it is judged based on the second verifying result that the yield and the productivity of the nonvolatile memory device are optimized, in other words, if the yield and the productivity of the nonvolatile memory device are higher than the target yield and the target productivity, the computer-implemented method of designing the nonvolatile memory device may be terminated. If it is judged based on the second verifying result that the yield and the productivity of the nonvolatile memory device are not optimized, in other words, if the yield and the productivity of the nonvolatile memory device are lower than a target yield and a target productivity, the first parameters are changed (step S1900), and the second optimization verifying operation is repeated by performing the steps S1200, S1300, S1400, S1500, S1600, S1700 and S1800 based on the changed first parameters.

In the computer-implemented method of designing the nonvolatile memory device according to other example embodiments, structural characteristics and manufacturing conditions of the nonvolatile memory device in the wafer-level and the chip-level, and operational conditions of the nonvolatile memory device are simultaneously improved by one design process. For example, the first parameters associated with the structural characteristics of the nonvolatile memory device in the wafer-level, the second parameters associated with the external environmental conditions, the third parameters associated with the structural characteristics of the nonvolatile memory device in the chip-level and the internal environmental conditions, the first initial operation condition associated with the erase operation, the second initial operation condition associated with the program operation, and the final operation condition associated with the reliability may be concurrently determined. The optimization verifying operations may be performed to check whether the final operation condition is optimized and to check whether the yield and the productivity are optimized. Thus, the designer may effectively design the nonvolatile memory device having optimized performance, yield and productivity.

According to example embodiments, the methods of FIGS. 1 and 14 may be implemented by a plurality of program commands stored in a computer readable medium. The program commands may be performed by a variety of computing systems. The computer readable medium may include a magnetic recording medium (e.g., a hard disk, a floppy disk, a magnetic tape, and so on), an optical recording medium (e.g., a CD-ROM, a DVD, and so on), a magnetic-optical recording medium (e.g., a floptical disk, and so on).

Figure 15:
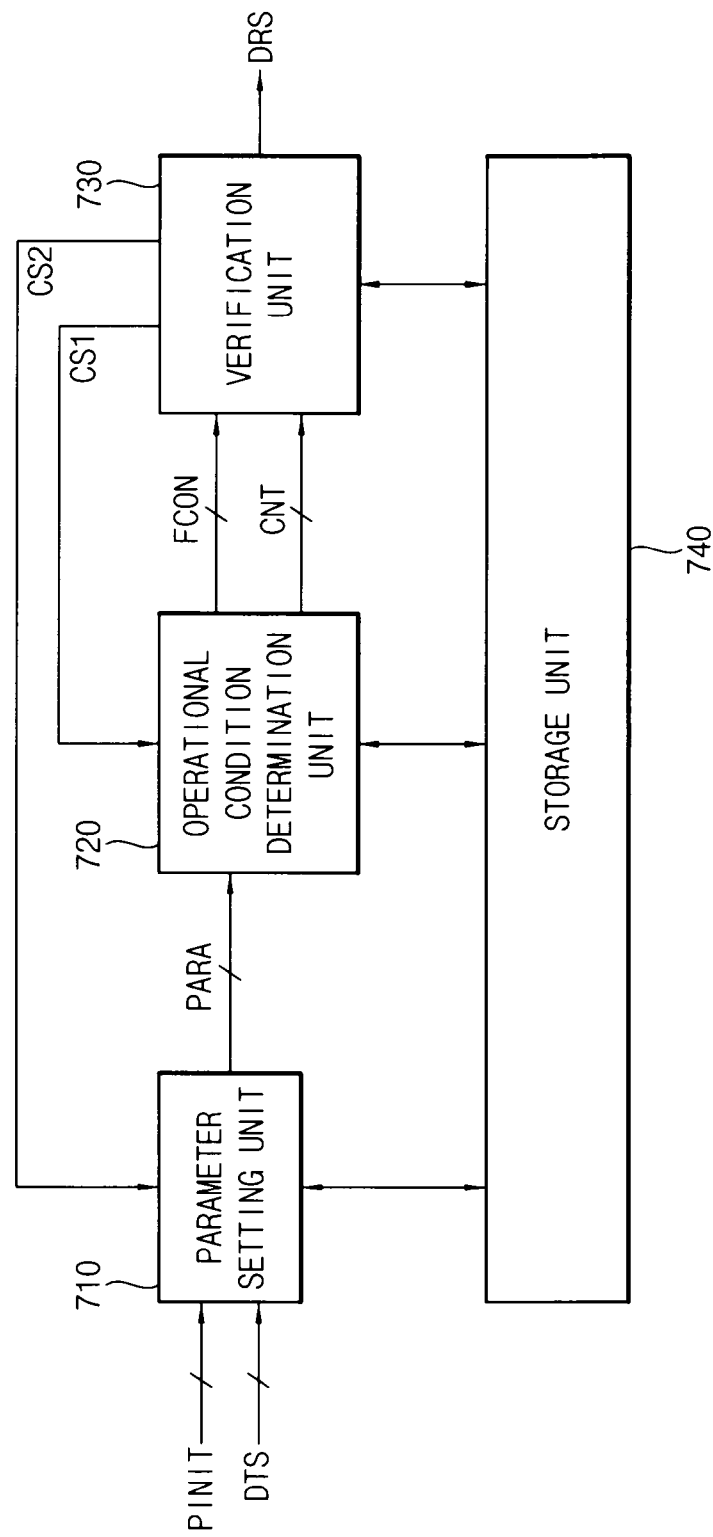
FIG. 15 is a block diagram illustrating a design device according to example embodiments.

FIG. 15 is a block diagram illustrating a design device according to example embodiments.

Referring to FIG. 15, the design device 700 for designing a nonvolatile memory device includes a parameter setting unit 710, an operational condition determination unit 720, a verification unit 730 and a storage unit 740.

The parameter setting unit 710 generates a plurality of parameters PARA based on an initial parameter signal PINIT, a design target signal DTS and a second control signal CS2. The plurality of parameters PARA may include first parameters associated with external environmental conditions of the nonvolatile memory device, and second parameters associated with structural characteristics and internal environmental conditions of the nonvolatile memory device. The plurality of parameters PARA may further include third parameters associated with severe environmental conditions and/or fourth parameters associated with structural characteristics of the nonvolatile memory device in a wafer-level. The initial parameter signal PINIT and the design target signal DTS may be provided from a designer or a developer of the nonvolatile memory device. The plurality of parameters PARA may be changed based on the second control signal CS2.

The operational condition determination unit 720 generates a final operation condition FCON and count signals CNT based on the plurality of parameters PARA and a first control signal CS1. The operational condition determination unit 720 may include an erase simulation model, a program simulation model and a reliability simulation model. The operational condition determination unit 720 may determine a first initial operation condition associated with an erase operation and a second initial operation condition associated with a program operation based on the plurality of parameters PARA, and may determine the final operation condition FCON based on the plurality of parameters PARA and the first and second initial operation conditions. The first and second initial operation conditions and the final operation condition FCON may be modified based on the first control signal CS1. The count signals CNT may be changed based on the number of determining the final operation condition FCON.

The verification unit 730 generates a design result signal DRS, the first control signal CS1 and the second control signal CS2 based on the final operation condition FCON and the count signals CNT. If the final operation condition FCON complies with a design target corresponding to the design target signal DTS, the verification unit 730 may activate the design result signal DRS to provide a final design result. If the final operation condition FCON does not comply with the design target, the verification unit 730 may modify the determination criterions for the first and second initial operation conditions by activating the first control signal CS1 based on the count signals CNT, or may change the plurality of parameters PARA by activating the second control signal CS2 based on the count signals CNT.

The storage unit 740 stores the plurality of parameters PARA, the first and second initial operation conditions, the final operation condition FCON and the design result signal DRS.

The design device 700 according to example embodiments may design the nonvolatile memory device based on the methods of FIGS. 1 and 14. Thus, the designer may effectively design the nonvolatile memory device having optimized performance, and the time required to complete designing of the nonvolatile memory device may be reduced.

Figure 16:
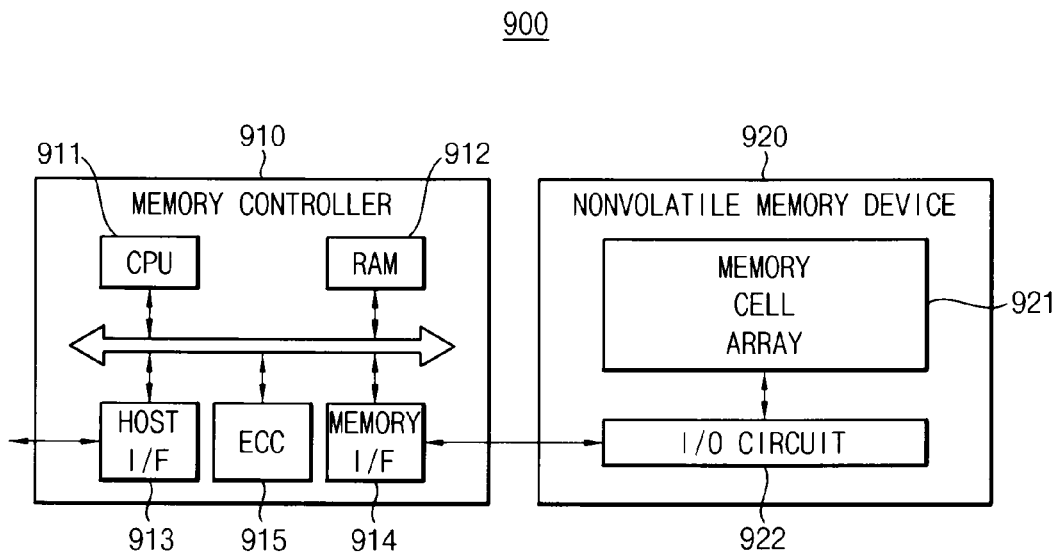
FIG. 16 is a block diagram illustrating a memory system according to example embodiments.

FIG. 16 is a block diagram illustrating a memory system according to example embodiments.

Figure 18:
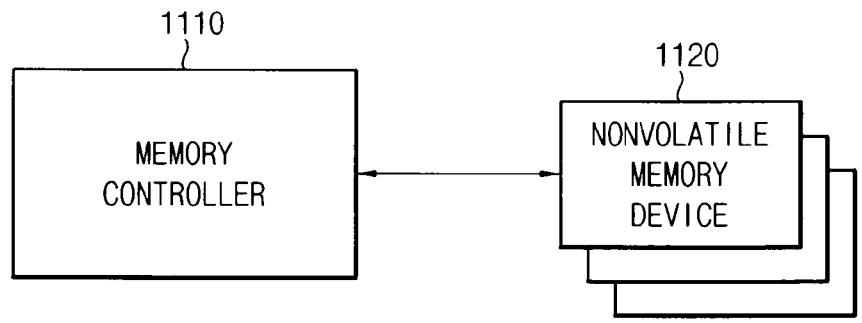
FIG. 18 is a diagram illustrating a solid state drive including a memory system according to example embodiments.

Referring to FIG. 18, a memory system 900 includes a memory controller 910 and a nonvolatile memory device 920.

The nonvolatile memory device 920 includes a memory cell array 921 and an I/O circuit 922. The I/O circuit 922 may include page buffers that are coupled to bitlines, and may store data to be written in the memory cell array 921 or data read out from the memory cell array 921. The memory cell array 921 may include memory cells coupled to wordlines and the bitlines. The nonvolatile memory device 920 may be designed based on the methods of FIGS. 1 and 14. Thus, the nonvolatile memory device having optimized performance may be effectively designed, and the time required to complete designing of the nonvolatile memory device may be reduced.

The memory controller 910 may control the nonvolatile memory device 920. The memory controller 910 may control data transfer between an external host (not illustrated) and the nonvolatile memory device 920. The memory controller 910 may include a central processing unit 911, a buffer memory 912, a host interface 913 and a memory interface 914. The central processing unit 911 may perform operations for the data transfer. The buffer memory 912 may be implemented by a dynamic random access memory (DRAM), a static random access memory (SRAM), a PRAM, a FRAM, a RRAM, a MRAM, and so on. According to example embodiments, the buffer memory 912 may be located inside or outside the memory controller 910.

The host interface 913 may be coupled to the host, and the memory interface 914 may be coupled to the nonvolatile memory device 920. The central processing unit 911 may communicate with the host via the host interface 913. For example, the host interface 913 may be configured to communicate with the host using at least one of a variety of interface protocols, such as a universal serial bus (USB), a multimedia card (MMC), a peripheral component interconnect-express (PCI-E), a small computer system interface (SCSI), a serial-attached SCSI (SAS), a serial advanced technology attachment (SATA), a parallel advanced technology attachment (PATA), an enhanced small disk interface (ESDI), integrated drive electronics (IDE), and so on. Further, the central processing unit 911 may communicate with the nonvolatile memory device 920 via the memory interface 914. In some example embodiments, the memory controller 910 may further include an error correction block 915 for error correction. According to example embodiments, the memory controller 910 may be built in the nonvolatile memory device 920, or the memory controller 910 and the nonvolatile memory device 920 may be implemented as separate chips.

The memory system 900 may be implemented as a memory card, a solid state drive, and so on. In some embodiments, the nonvolatile memory device 920, the memory controller 910 and/or the memory system 900 may be packaged in accordance with a variety of packaging technologies, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 17:
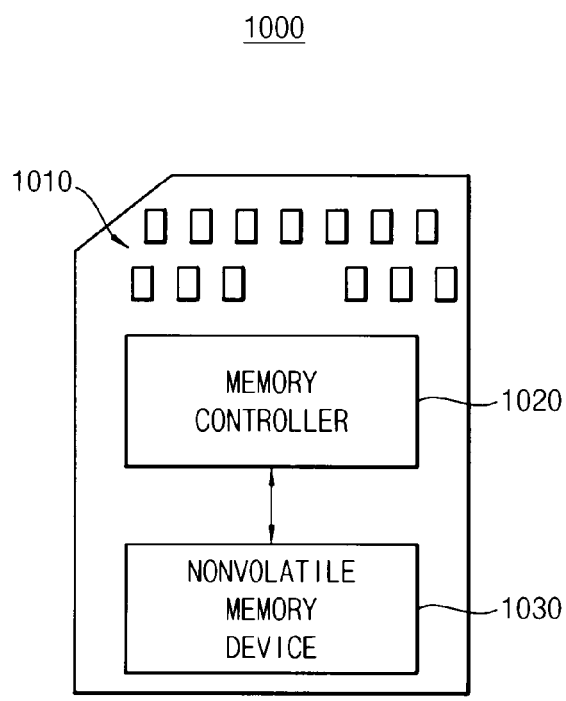
FIG. 17 is a diagram illustrating a memory card including a memory system according to example embodiments.

FIG. 17 is a diagram illustrating a memory card including a memory system according to example embodiments.

Referring to FIG. 17, a memory card 1000 may include a plurality of connecting pins 1010, a memory controller 1020 and a nonvolatile memory device 1030.

The connecting pins 1010 may be coupled to a host (not illustrated) to transfer signals between the host and the memory card 1000. The connecting pins 1010 may include a clock pin, a command pin, a data pin and/or a reset pin.

The memory controller 1020 may receive data from the host, and may store the received data in the nonvolatile memory device 1030.

The nonvolatile memory device 1030 may be designed based on the methods of FIGS. 1 and 14. Thus, the nonvolatile memory device having optimized performance may be effectively designed, and the time required to complete designing of the nonvolatile memory device may be reduced.

For example, the memory card 1000 may include a MMC, an embedded MMC (eMMC), a hybrid embedded MMC (hybrid eMMC), a secure digital (SD) card, a micro-SD card, a memory stick, an ID card, a personal computer memory card international association (PCMCIA) card, a chip card, a USB card, a smart card, a compact flash (CF) card, and so on.

In some embodiments, the memory card 1000 may be coupled to the host, such as a desktop computer, a laptop computer, a tablet computer, a mobile phone, a smart phone, a music player, a personal digital assistants (PDA), a portable multimedia player (PMP), a digital television, a digital camera, a portable game console, and so on.

FIG. 18 is a diagram illustrating a solid state drive including a memory system according to example embodiments.

Figure 20:
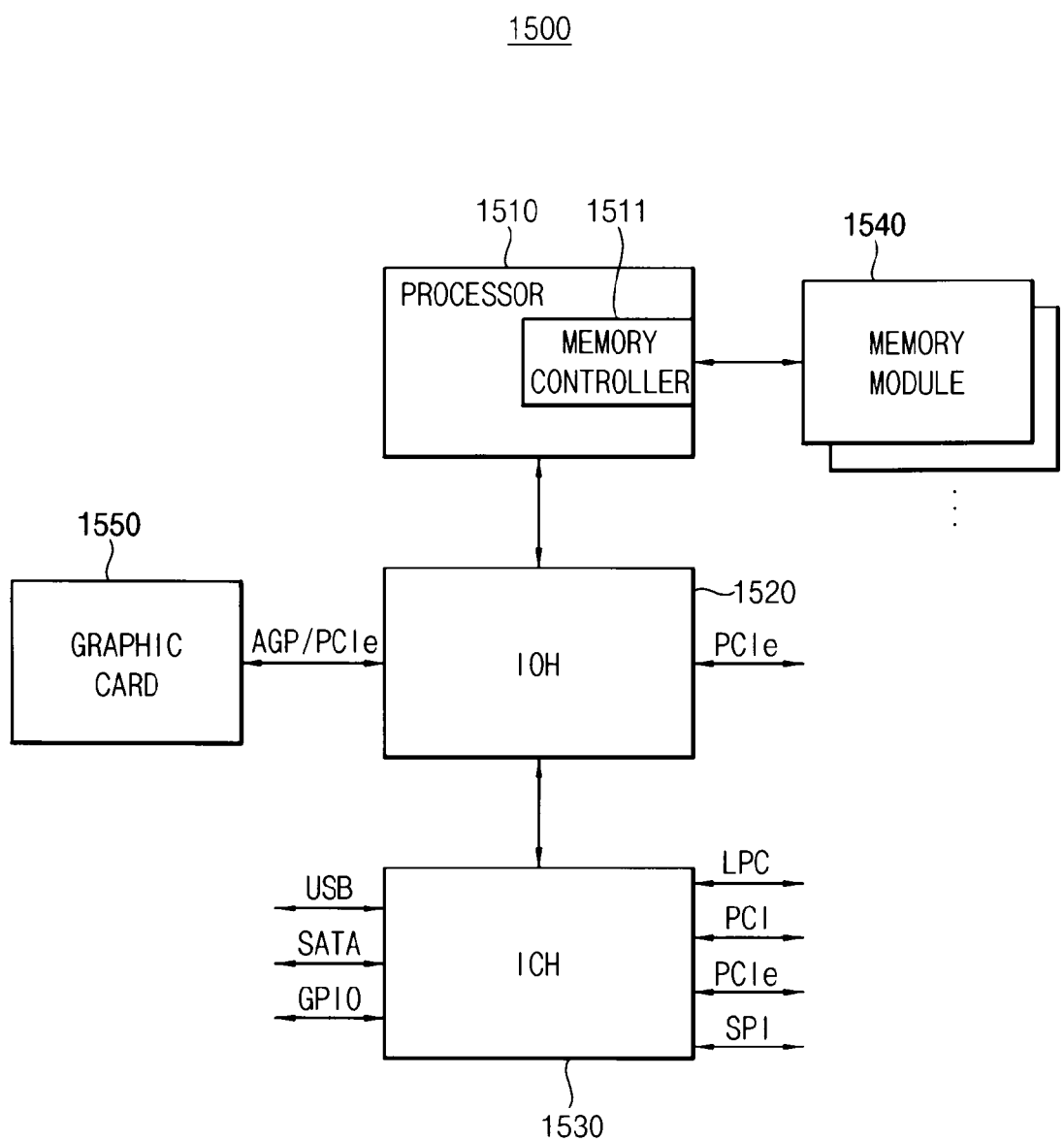
FIG. 20 is a diagram illustrating a computing system according to example embodiments.

Referring to FIG. 20, a solid state drive (SSD) 1100 includes a memory controller 1110 and a plurality of nonvolatile memory devices 1120.

The memory controller 1110 may receive data from a host (not illustrated). The memory controller 1110 may store the received data in the plurality of nonvolatile memory devices 1120.

The nonvolatile memory device 1120 may be designed based on the methods of FIGS. 1 and 14. Thus, the nonvolatile memory device having optimized performance may be effectively designed, and the time required to complete designing of the nonvolatile memory device may be reduced.

In some embodiments, the solid state drive 1100 may be coupled to the host, such as a mobile device, a mobile phone, a smart phone, a PDA, a PMP, a digital camera, a portable game console, a music player, a desktop computer, a notebook computer, a tablet computer, a speaker, a video, a digital television, and so on.

Figure 19:
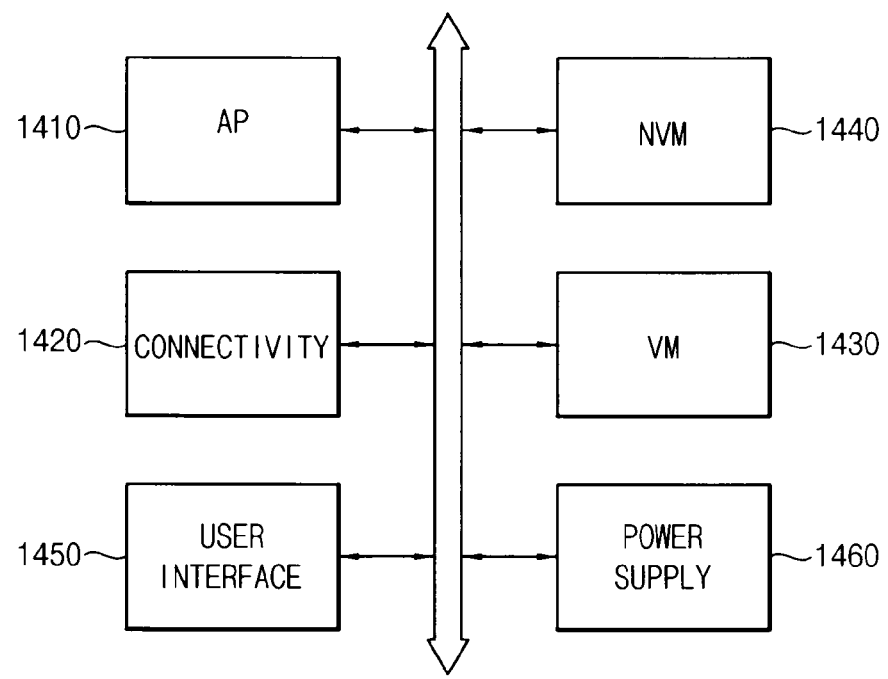
FIG. 19 is a diagram illustrating a mobile system according to example embodiments.

FIG. 19 is a diagram illustrating a mobile system according to example embodiments.

Referring to FIG. 19, a mobile system 1400 includes an application processor 1410, a connectivity unit 1420, a volatile memory device 1430, a nonvolatile memory device 1440, a user interface 1450 and a power supply 1460. According to example embodiments, the mobile system 1400 may be any mobile system, such as a mobile phone, a smart phone, a tablet computer, a laptop computer, a PDA, a PMP, a digital camera, a portable game console, a music player, a camcorder, a video player, a navigation system, and so on.

The application processor 1410 may execute applications, such as an internet browser, a game application, a video player application, and so on. According to example embodiments, the application processor 1410 may include a single processor core or a plurality of processor cores. For example, the application processor 1410 may be a multi-core processor, such as a dual-core processor, a quad-core processor, a hexa-core processor, and so on. In some example embodiments, the application processor 1410 may further include a cache memory located inside or outside the application processor 1410.

The connectivity unit 1420 may perform wired or wireless communication with an external device. For example, the connectivity unit 1420 may perform a USB communication, an Ethernet communication, a near field communication (NFC), a radio frequency identification (RFID) communication, a mobile telecommunication, a memory card communication, wireless internet, wireless fidelity (Wi-Fi), global positioning system (GPS), Bluetooth (BT), global system for mobile communication (GSM), general packet radio system (GPRS), wideband code division multiple access (WCDMA), high speed uplink/downlink packet access (HSx PA), and so on. The connectivity unit 1420 may include a baseband chipset.

The volatile memory device 1430 may store an instruction/data processed by the application processor 1410, or may serve as a working memory. For example, the volatile memory device 1430 may be implemented by a DRAM, a SRAM, a mobile DRAM, or the like.

The nonvolatile memory device 1440 may store a boot image for booting the mobile system 1400. For example, the nonvolatile memory device 1440 may be implemented by an electrically erasable programmable read-only memory (EEPROM), a flash memory, a PRAM, a RRAM, a MRAM, a FRAM, a nano floating gate memory (NFGM), a polymer random access memory (PoRAM), or the like. The nonvolatile memory device 1440 may be designed based on the methods of FIGS. 1 and 14. Thus, the nonvolatile memory device having optimized performance may be effectively designed, and the time required to complete designing of the nonvolatile memory device may be reduced.

The user interface 1450 may include at least one input device, such as a keypad, a touch screen, and so on, and at least one output device, such as a display device, a speaker, and so on. The power supply 1460 may supply the mobile system 1400 with power. In some example embodiments, the mobile system 1400 may further include a camera image processor (CIS), storage device, such as a memory card, a SDD, a CD-ROM, and so on.

According to example embodiments, the mobile system 1400 and/or components of the mobile system 1400 may be packaged in accordance with a variety of package technologies, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

FIG. 20 is a diagram illustrating a computing system according to example embodiments.

Referring to FIG. 20, a computing system 1500 includes a processor 1510, an I/O hub 1520, an I/O controller hub 1530, at least one memory module 1540 and a graphic card 1550. According to example embodiments, the computing system 1500 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, and so on.

The processor 1510 may perform specific calculations or tasks. For example, the processor 1510 may be a microprocessor, a central process unit (CPU), a digital signal processor, or the like. According to example embodiments, the processor 1510 may include a single processor core or a plurality of processor cores. For example, the processor 1510 may be a multi-core processor, such as a dual-core processor, a quad-core processor, a hexa-core processor, and so on. Although FIG. 20 illustrates an example of the computing system 1500 including one processor 1510, according to example embodiments, the computing system 1500 may include a plurality of processors. In some example embodiments, the processor 1510 may further include a cache memory located inside or outside the processor 1510.

The processor 1510 may include a memory controller (not illustrated) that controls an operation of the memory module 1540. The memory controller included in the processor 1510 may be referred to as an integrated memory controller (IMC). A memory interface between the memory controller and the memory module 1540 may be implemented by one channel including a plurality of signal lines, or by a plurality of channels. Each channel may be coupled to at least one memory module 1540. In some example embodiments, the memory controller may be included in the I/O hub 1520. The I/O hub 1520 including the memory controller may be referred to as a memory controller hub (MCH).

The memory module 1540 may include a plurality of nonvolatile memory devices that store data provided from the memory controller 1511. The nonvolatile memory devices may be designed based on the methods of FIGS. 1 and 14. Thus, the nonvolatile memory device having optimized performance may be effectively designed, and the time required to complete designing of the nonvolatile memory device may be reduced.

The I/O hub 1520 may manage data transfer between processor 1510 and devices, such as the graphic card 1550. The I/O hub 1520 may be coupled to the processor 1510 via at least one of a variety of interfaces, such as a front side bus (FSB), a system bus, a HyperTransport, a lightning data transport (LDT), a QuickPath interconnect (QPI), a common system interface (CSI), and so on. Although FIG. 22 illustrates an example of the computing system 1500 including one I/O hub 1520, according to example embodiments, the computing system 1500 may include a plurality of I/O hubs.

The I/O hub 1520 may provide a variety of interfaces with the devices. For example, the I/O hub 1520 may provide an accelerated graphics port (AGP) interface, a peripheral component interface-express (PCIe), a communications streaming architecture (CSA) interface, and so on.

The graphic card 1550 may be coupled to the I/O hub 1520 via the AGP or the PCIe. The graphic card 1550 may control a display device (not illustrated) for displaying an image. The graphic card 1550 may include an internal processor and an internal memory to process the image. In some example embodiments, the input/output hub 1520 may include an internal graphic device along with or instead of the graphic card 1550. The internal graphic device may be referred to as an integrated graphics, and an I/O hub including the memory controller and the internal graphic device may be referred to as a graphics and memory controller hub (GMCH).

The I/O controller hub 1530 may perform data buffering and interface arbitration to efficiently operate a variety of system interfaces. The I/O controller hub 1530 may be coupled to the I/O hub 1520 via an internal bus. For example, the I/O controller hub 1530 may be coupled to the I/O hub 1520 via at least one of a variety of interfaces, such as a direct media interface (DMI), a hub interface, an enterprise Southbridge interface (ESI), PCIe, and so on.

The I/O controller hub 1530 may provide a variety of interfaces with peripheral devices. For example, the I/O controller hub 1530 may provide a universal serial bus (USB) port, a serial advanced technology attachment (SATA) port, a general purpose input/output (GPIO), a low pin count (LPC) bus, a serial peripheral interface (SPI), a PCI, a PCIe, and so on.

In some example embodiments, the processor 1510, the I/O hub 1520 and the I/O controller hub 1530 may be implemented as separate chipsets or separate integrated circuits. In other embodiments, at least two of the processor 1510, the I/O hub 1520 and the I/O controller hub 1530 may be implemented as one chipset.

The above described embodiments may be used in any device or system which includes a nonvolatile memory device, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, and so on.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A computer-implemented method of designing a nonvolatile memory device, the method comprising:
    setting first parameters associated with external environmental conditions of the nonvolatile memory device;
    setting second parameters associated with structural characteristics and internal environmental conditions of the nonvolatile memory device;
    executing a first computer simulation to determine a first initial operation condition based on the first parameters and the second parameters, the first initial operation condition being associated with an erase operation of the nonvolatile memory device;
    executing a second computer simulation to determine a second initial operation condition based on the first parameters, the second parameters and the first initial operation condition, the second initial operation condition being associated with a program operation of the nonvolatile memory device; and
    determining a final operation condition based on the first parameters, the second parameters, the first initial operation condition and the second initial operation condition, the final operation condition being associated with reliability of the nonvolatile memory device.

2. The method of claim 1, wherein the first computer simulation includes:
    setting an erasing scheme and an erase verification voltage based on the first parameters and the second parameters;
    computer simulating the erase operation on memory cells included in the nonvolatile memory device based on the erasing scheme;
    computer simulating a first sensing operation on the memory cells based on the erase verification voltage to generate a first sensing result; and
    determining a first threshold voltage distribution of the memory cells based on the first sensing result, the first threshold voltage distribution corresponding to the first initial operation condition.

3. The method of claim 2, wherein the erase operation and the first sensing operation are repeatedly computer simulated when it is judged based on the first sensing result that at least one of the memory cells is incompletely erased, and wherein the first threshold voltage distribution is determined to correspond to the result of the erase operation when it is judged based on the first sensing result that all of the memory cells are completely erased.

4. The method of claim 2, wherein the first computer simulation further includes:
    measuring an erasing time that is required to complete the erase operation and the first sensing operation.

5. The method of claim 2, wherein the second computer simulation includes:
    setting a programming scheme and a program verification voltage based on the first parameters, the second parameters and the first initial operation condition;
    computer simulating the program operation on the memory cells based on the programming scheme;
    computer simulating a second sensing operation on the memory cells based on the program verification voltage to generate a second sensing result; and
    determining a second threshold voltage distribution of the memory cells based on the second sensing result, the second threshold voltage distribution corresponding to the second initial operation condition.

6. The method of claim 5, wherein the program operation and the second sensing operation are repeatedly computer simulated when it is judged based on the second sensing result that at least one of the memory cells is incompletely programmed, and wherein the second threshold voltage distribution is determined to correspond to the result of the program operation when it is judged based on the second sensing result that all of the memory cells are completely programmed.

7. The method of claim 5, wherein second computer simulation further includes:
measuring a programming time that is required to complete the program operation and the second sensing operation.

8. The method of claim 5, wherein the determining the final operation condition includes:
setting a reliability testing scheme based on the first parameters, the second parameters, the first initial operation condition and the second initial operation condition;
computer simulating a reliability test operation on the memory cells based on the reliability testing scheme to generate a test result; and
determining a third threshold voltage distribution of the memory cells based on the test result, the third threshold voltage distribution corresponding to the final operation condition.

9. The method of claim 8, wherein the computer simulating the reliability test operation includes:
computer simulating a stress-applying operation on the memory cells based on the reliability testing scheme;
after simulation of the stress-applying operation, analyzing a threshold voltage distribution of the memory cells to generate an analysis result; and
selectively adjusting a level of the program verification voltage based on the analysis result.

10. The method of claim 9, wherein the level of the program verification voltage is changed when it is judged based on the analysis result that the threshold voltage distribution of the memory cells after the simulation of the stress-applying operation is different from the second threshold voltage distribution, and wherein the level of the program verification voltage is maintained when it is judged based on the analysis result that the threshold voltage distribution of the memory cells after the computer simulation of the stress-applying operation is substantially the same as the second threshold voltage distribution.

11. The method of claim 1, further comprising:
performing an optimization verifying operation to check whether the final operation condition is optimized and to generate a verifying result.

12. The method of claim 11, wherein at least one of design schemes for the nonvolatile memory device is modified and the final operation condition is redetermined when it is judged based on the verifying result that the final operation condition is not optimized, and wherein the computer-implemented method of designing the nonvolatile memory device is terminated when it is judged based on the verifying result that the final operation condition is optimized.

13. The method of claim 11, wherein the performing the optimization verifying operation includes:
checking whether the final operation condition complies with a design target of the nonvolatile memory device to generate a check result; and
selectively modifying at least one of the first and second parameters and determination criterions for the first and second initial operation conditions based on a first reference value, a second reference value, a third reference value and the check result,
wherein the final operation condition is redetermined based on at least one of the modified parameters and the modified determination criterions.

14. The method of claim 13, wherein a first count value, a second count value and a third count value that are changed as the redetermination number of the final operation condition increases are generated, and
wherein the selectively modifying at least one of the parameters and the determination criterions includes:
modifying the determination criterion for the second initial operation condition when the first count value is smaller than the first reference value;
modifying the determination criterion for the first initial operation condition when the second count value is smaller than the second reference value;
changing the second parameters when the third count value is smaller than the third reference value; and
changing the first parameters when the first count value is larger than the first reference value, the second count value is larger than the second reference value, and the third count value is larger than the third reference value.

15. A computer-implemented method of designing a nonvolatile memory device, the method comprising:
setting first parameters associated with external environmental conditions of the nonvolatile memory device;
setting second parameters associated with structural characteristics and internal environmental conditions of the nonvolatile memory device;
executing a first computer simulation to determine an erase threshold voltage distribution based on an erasing scheme by setting a target erasing speed with respect to memory cells included in the nonvolatile memory device based on the first parameters and the second parameters, and by setting the erasing scheme to be satisfied the target erasing speed;
executing a second computer simulation to determine an initial program threshold voltage distribution based on a programming scheme by setting a target programming speed, an interference condition and a disturbance condition with respect to the memory cells based on the first parameters, the second parameters and the erase threshold voltage distribution, and by setting the programming scheme to satisfy the target programming speed, the interference condition and the disturbance condition;
executing a third computer simulation to determine a final program threshold voltage distribution based on a reliability testing scheme by setting an endurance condition and a data retention condition with respect to the memory cells based on the first parameters, the second parameters, the erase threshold voltage distribution and the initial program threshold voltage distribution, and by setting the reliability testing scheme to satisfy the endurance condition and the data retention condition; and
performing an optimization verifying operation to check whether the final program threshold voltage distribution is optimized.

16. A computer-implemented method of designing a nonvolatile memory device, the method comprising:
setting an erasing scheme and an erase verification voltage in accordance with at least one set parameter;
executing a computer simulated erase operation of memory cells of the nonvolatile memory device in accordance with the erasing scheme;
executing a computer simulated first sensing operation of the memory cells based on the erase verification voltage;
repeating the computer simulated erase operation and the computer simulated first sensing operation until successful completion of the erase operation has been verified;

determining a first threshold voltage distribution of the memory cells upon successful completion of the erase operation;

setting a programming scheme and a program verification voltage in accordance with the first threshold voltage distribution and the at least one set parameter;

executing a computer simulated program operation of the memory cells of the nonvolatile memory device in accordance with the programming scheme;

executing a computer simulated second sensing operation of the memory cells based on the program verification voltage;

repeating the computer simulated program operation and the computer simulated second sensing operation until successful completion of the program operation has been verified;

determining a second threshold voltage distribution of the memory cells upon successful completion of the program operation.

17. The method of claim 16, wherein the at least one set parameter includes first parameters associated with external environmental conditions of the nonvolatile memory device, and second parameters associated with structural characteristics and internal environmental conditions of the nonvolatile memory device.

18. The method of claim 17, further comprising determining a final operation design condition of the nonvolatile memory device based on the first parameters, the second parameters, the first threshold voltage distribution and the second threshold voltage distribution, the final operation condition being associated with a reliability of the nonvolatile memory device.

19. The method of claim 16, further comprising:
   measuring an erasing time that is required to complete the erase operation and the first sensing operation, and
   determining a programming time that is required to complete the program operation and the second sensing operation.

20. The method of claim 16, wherein the set parameters are supplied from one of a manufacturing process using test element group (TEG) and a technology computer aided design (TCAD) program.

* * * * *